US012516230B2

(12) United States Patent
Gutsulyak et al.

(10) Patent No.: US 12,516,230 B2
(45) Date of Patent: Jan. 6, 2026

(54) ADHESION ENHANCEMENT COMPOSITIONS

(71) Applicant: L.B. FOSTER RAIL TECHNOLOGIES, CORP., Burnaby (CA)

(72) Inventors: Dmitry Gutsulyak, Burnaby (CA); Donald Eadie, Mayne Island (CA)

(73) Assignee: L.B. Foster Rail Technologies, Corp., Burnaby (CA)

(*) Notice: Subject to any disclaimer, the term of this patent is extended or adjusted under 35 U.S.C. 154(b) by 1189 days.

(21) Appl. No.: 16/490,300

(22) PCT Filed: Mar. 1, 2018

(86) PCT No.: PCT/CA2018/050242
§ 371 (c)(1),
(2) Date: Aug. 30, 2019

(87) PCT Pub. No.: WO2018/157252
PCT Pub. Date: Sep. 7, 2018

(65) Prior Publication Data
US 2020/0102484 A1    Apr. 2, 2020

(30) Foreign Application Priority Data
Mar. 1, 2017   (WO) ................ PCT/CA2017/050277

(51) Int. Cl.
*C09K 3/00*       (2006.01)
*B61C 15/08*      (2006.01)
(Continued)

(52) U.S. Cl.
CPC .............. *C09K 3/149* (2013.01); *B61C 15/08* (2013.01); *C09D 5/00* (2013.01); *C09D 7/61* (2018.01);
(Continued)

(58) Field of Classification Search
CPC ............ C09K 3/149; C09D 7/69; C09D 7/61; C09D 5/00; C09D 101/02; C09D 105/00; B61C 15/08; C23C 26/00; E01B 31/02
(Continued)

(56) References Cited

U.S. PATENT DOCUMENTS 2,995,393 A * 8/1961 Charp .................... B05B 5/032
                                                  239/707
3,867,647 A   2/1975 Callahan et al.
(Continued)

FOREIGN PATENT DOCUMENTS

CA      2381678      4/2002
CA      2227351      9/2003
(Continued)

OTHER PUBLICATIONS

D I Fletcher, S Lewis, Creep curve measurement to support wear and adhesion modelling, using a continuously variable creep twin disc machine, Wear 298-299 (2013) 57-65).

*Primary Examiner* — James E Mcdonough
(74) *Attorney, Agent, or Firm* — Paul D. Bangor, Jr., Esq.; Clark Hill PLC

(57)   ABSTRACT

A composition for increasing adhesion between two surfaces that are in traction, sliding or rolling-sliding contact with each other is provided. The composition comprises one or more than one first component, where each of the one or more than one first component has a Mohs hardness value of equal to or greater than 7, and one or more than one organic rheology additive. The one or more than one first component and the one or more than one organic rheology additive are present in a ratio from about 90:10 to about 99.9:0.1 (wt/wt). The composition does not comprise water. A method of increase adhesion between two steel surfaces in sliding-rolling contact is also described. The method involves
(Continued)

applying the composition to the rail surface at a rate sufficient to increase the adhesion between the two steel surfaces.

8 Claims, 22 Drawing Sheets

(51) Int. Cl.

| | | |
|---|---|---|
| C09D 5/00 | (2006.01) | |
| C09D 7/40 | (2018.01) | |
| C09D 7/61 | (2018.01) | |
| C09D 101/02 | (2006.01) | |
| C09D 105/00 | (2006.01) | |
| C09K 3/14 | (2006.01) | |
| C23C 26/00 | (2006.01) | |
| E01B 31/02 | (2006.01) | |

(52) U.S. Cl.
CPC .............. *C09D 7/69* (2018.01); *C09D 101/02* (2013.01); *C09D 105/00* (2013.01); *C23C 26/00* (2013.01); *E01B 31/02* (2013.01)

(58) Field of Classification Search
USPC .......................................................... 106/36
See application file for complete search history.

(56) References Cited

U.S. PATENT DOCUMENTS

| | | |
|---|---|---|
| 4,071,282 A | 1/1978 | Callahan et al. |
| 4,431,227 A | 2/1984 | Howell |
| 5,308,516 A | 5/1994 | Chiddick |
| 5,919,295 A | 7/1999 | Lamba et al. |
| 6,722,589 B1 | 4/2004 | Ohno et al. |
| 7,273,131 B2 | 9/2007 | Urmson, Jr. et al. |
| 7,311,274 B2 | 12/2007 | Ohno et al. |
| 8,955,645 B2 | 2/2015 | Singleton et al. |
| 10,815,320 B2 | 10/2020 | Anderson |
| 2002/0009622 A1 | 1/2002 | Goodson |
| 2003/0013615 A1 | 1/2003 | Levy |
| 2003/0195123 A1 | 10/2003 | Cotter |
| 2004/0053790 A1 | 3/2004 | Cotter |
| 2010/0113670 A1 | 5/2010 | Audenaert |
| 2013/0025500 A1 * | 1/2013 | Jones ..................... C11D 3/225 |
| | | 106/205.72 |
| 2013/0092788 A1 | 4/2013 | Olsen |
| 2013/0288004 A1 | 10/2013 | Zheng |

FOREIGN PATENT DOCUMENTS

| | | | |
|---|---|---|---|
| CA | 2894931 | 7/2014 | |
| CN | 101381484 | 3/2009 | |
| GB | 2459193 | 10/2009 | |
| GB | 2459193 A * | 10/2009 | ............. C09K 3/149 |
| JP | 2014034838 | 7/2016 | |
| WO | 2002/026919 | 4/2002 | |
| WO | 2006/084386 | 8/2006 | |
| WO | WO-2006084386 A1 * | 8/2006 | ............... B61K 3/00 |
| WO | 2011/143765 | 11/2011 | |
| WO | 2013/067628 | 5/2013 | |
| WO | 2018157226 | 9/2018 | |
| WO | 2018157252 | 9/2018 | |

* cited by examiner

A: HI-SIL T800 silica; B: LO-VEL27 silica; C: Silica gel; E: Fe2O3; F: Fe3O4; G: MgO; H: ZnO; I: Disperal HP 14/7; J: Attagel 50; K: Kamin 70C kaolin; L: Kamin 90 kaolin; M: Mica C4000; N: Nicron 604 talc; O: Volclay Bentonite; P: Attagel 19; Q: Calcium Carbonate.

A: Silica gel; B: HI-SIL T800; C: LO-VEL27; D: MgO; E: ZnO; F: $Fe_2O_3$; G: $Fe_3O_4$; H: Kamin 70C; I: Disperal HP 14/7; J: Kamin 90; K: Mica C4000; L: Nicron 604 talc; M: Volclay Bentonite; N: Attagel 50; O: Attagel 19; P: $CaCO_3$.

ADHESION ENHANCEMENT COMPOSITIONS

TECHNICAL FIELD

The present invention relates to adhesion enhancement compositions for applying to steel surfaces that are in traction, sliding or rolling-sliding contact. Methods for enhancing adhesion between two steel surfaces in sliding rolling contact are also provided.

BACKGROUND

Sufficient minimum adhesion between two steel surfaces in a sliding or rolling-sliding contact, for example a train wheel and a rail as used in freight, passenger, and mass transit train systems, is required for safe and effective train operation. The co-efficient of friction obtained between the two steel surfaces varies, in part, upon the environmental conditions and contamination to which the rail and wheel are exposed. Variation in conditions of the rail or wheel may alter the frictional forces generated between the train wheel and the rail, and varied conditions may also impact the adhesion levels that exist between the train wheel and the rail as the wheel passes over the rail. Contamination of the train wheel and rail interface by water, dew, snow, rust and wear debris, organic debris, fallen leaves, grease, oil, or a combination of these contaminants, typically decreases the adhesion level between train wheels and rail. Low adhesion conditions between the train wheels and the rail may result in poor train performance arising from an increased sliding between the wheel-rail surfaces, increased braking distance, reduced train acceleration, and an inability to maintain sufficient tractive effort. Slip-slide can cause a problem to some signalling systems due to a mismatch between distance traveled and wheel rotations. Poor control of braking can cause station overruns and service interruptions. Insufficient tractive effort can lead to freight trains stalling on heavy grades.

To overcome low adhesion levels between train wheels and the rail, high-speed water pressure jets may be used. However, some contamination, for example, leaf contamination may be tenaciously bonded to the rail, may be localized along the rail, and the contaminated depth may vary and the amount of material to be removed from the rail head using pressurized jets may be inconsistent. Rail grinding may be used on some track sections to remove contaminated layers that are chemically bonded to the rail material; however, this is a slow and intensive process, the cost is high, and is often hindered by track access and logistical limitations.

Alternate approaches involve the use of sand, which may be dispersed on the rail surface as an adhesion enhancement agent. However, sand application results in increased wear rates of the rail and train wheel surfaces and the use of sand may promote stick-slip oscillations. Sand is also difficult to handle, can become clogged in dispensing equipment due to absorption of moisture, and in some countries its use is restricted due to health concerns related to small particles of silica. Sand also has limited effectiveness (often about 4 axles maximum) due to loss of activity when the particles are crushed under the wheel. On trains with multiple driven axles, multiple sanders must be installed on the train. Dispersions of sand suspended in water with a thickening agent (for example, Sandite or other similar materials) may be used to treat areas of rail having low adhesion.

U.S. Pat. No. 4,431,227 discloses pads adhered to a train wheel. The pads comprise a high frictional surface that contacts the rail as the train wheel rolls along the rail. The high frictional surface may be coated with industrial diamonds or cermets. Suitable cermets may include oxides of aluminium and silicon, the carbides of silicon and titanium, and the borides of nitrogen and carbon.

U.S. Pat. No. 5,308,516 discloses friction modifying compositions comprising a resin, a solid lubricant and a friction enhancer, for example calcium carbonate, magnesium silicate, magnesium carbonate, bentonite, coal dust, barium sulphate, asbestos, aluminium silicate, silica, amorphous silica, synthetic silica, natural silica, slate powder, diatomaceous earth, ground quartz, zinc stearate, aluminium stearate, zinc oxide, iron oxide, antimony oxide, dolomite, lead carbonate, calcium sulphate, calcium sulphate, napthalene synemite, and polyethylene fibres.

WO 2002/026919 discloses friction control compositions comprising water, a rheological agent (e.g. clay, casein carboxymethylcellulose), a retentivity (film-forming) agent, an optional lubricant, and an optional friction modifying material that impart a positive friction characteristic and increase in the friction coefficient between two surfaces. Friction modifying materials include calcium carbonate, magnesium carbonate, magnesium silicate, clay, ground coal, calcium sulphate, asbestine derivative of asbestos, aluminium silicate, amorphous silica (synthetic), slate powder, diatomaceous earth, zinc stearate, aluminium stearate, magnesium carbonate, lead oxide, basic lead carbonate, zinc oxide, antimony oxide dolomite (MgCo CaCo), calcium sulphate barium sulphate (e.g. Baryten), polyethylene fibres, aluminum oxide, red iron oxide ($Fe_2O_3$), black iron oxide ($Fe_3O_4$), magnesium oxide and zirconium oxide.

U.S. Pat. No. 5,919,295 discloses an adhesion enhancing mixture that contains a hard particle constituent preferably including alumina; a soft particle constituent preferably including titania; and an iron oxide constituent. In a preferred embodiment, bauxite is used as the primary component of the mixture. The mixture may be in the form of a dry powder, a paste with water or alcohol vehicle, or a metal composite that includes the powder.

U.S. Pat. No. 6,722,589 discloses an injector device for applying slip prevention particles. The slip prevention particles may include natural sand, silica sand, alumina particles, metal particles, and ceramic particles like mullite (i.e. $3Al_2O_3 \cdot 2SiO_2$ or $2Al_2O_3 \cdot SiO_2$) having a diameter of 10-500 micrometers. The particles are mixed with water and sprayed onto a rail using the injector device.

CN 101381484 discloses a synthetic material capable of enhancing the friction coefficient between two surfaces, the material comprises rubber, steel fibres, magnesium oxide, calcined petroleum coke, silicon carbide, barium sulfate, graphite, and molybdenum disulfide.

U.S. Pat. No. 7,311,274 describes an antislip material ejector for ejecting materials that include natural sand, silica sand, alumina, mullite, ceramic particles such as silicone carbide, and metallic particles such as those of chrome, tungsten, molybdenum.

Adhesion enhancement compositions generally perform with varying levels of effectiveness depending on the contaminant at issue (e.g. oil, grease, water, organic debris), and the quantity, or rate, that the adhesion enhancement composition is applied to the rail. For example, some adhesion enhancement compositions perform well against some contaminant conditions, but not others. Similarly, some adhesion enhancement compositions perform well at certain application rates or quantities, but not others.

SUMMARY

The present invention relates to adhesion enhancement compositions for applying to steel surfaces that are in traction, sliding or rolling-sliding contact. Methods for enhancing adhesion between two steel surfaces in sliding rolling contact are also provided.

As described herein there is provided a composition for increasing adhesion (an adhesion enhancement composition) between two surfaces that are in sliding or rolling-sliding contact with each other the composition comprising:
one or more than one first component, each of the one or more than one first component having a Mohs hardness value of equal to or greater than 7 (or a Vickers hardness of greater than or equal to 1000), and
one or more than one organic rheology additive,
wherein the one or more than one first component and the one or more than one organic rheology additive are present in a ratio from about 90:10 to about 99.9:0.1 (wt/wt), and wherein the composition does not comprise water.

The adhesion enhancement composition results in an increase in adhesion between two surfaces in traction, sliding or rolling contact, when compared with the application of the first component at a same rate and under the same conditions.

The one or more than one first component of the composition as described above may be selected from the group of carbide based compounds, amphoteric oxide based compounds, zirconium oxide based compounds, and any combination thereof. The one or more than one first component may be boron nitride, diamond, nanocrystalline diamond, fullerite (polymerized $C_{60}$), crystalline silica (sand), a carbide based compound for example, boron carbide, or a mineral, for example, garnet or topaz.

The one or more than one organic rheology additive may be an organic polymer absorbent, an acrylic, a superabsorbent polymer, a xanthan gum (for example, Vanzan™ (for example, Vanzan™ D) or CCL xanthan gum), a guar gum, a cellulosic material (for example, carboxymethyl cellulose (CMC), carboxy-hydroxymethyl cellulose (CHMC; METHOCEL™) and ethoxymethyl cellulose (EMC)), a polysaccharide (for example, chitosan or a starch) or any combination thereof. The one or more than one organic rheology additive may be an alkali-swellable (or soluble) emulsion (ASE), a hydrophobically modified alkali-swellable emulsion (HASE), a hydrophobically modified ethoxylated urethane resin (HEUR) or any combination thereof. The one or more than one organic rheology additive may be Vanzan™ D, Mecellose PMC40H or CMC P1-8000.

Also provided is the composition as described above, wherein the one or more than one first component has a particle size of from about 1 μm to about 1600 μm and the one or more than one organic rheology additive has a particle size of about 500 μm or less. For example, the particle size of the organic rheology additive may be from about 1 μm to about 30 μm, about 30 μm to about 100 μm, about 100 μm to about 200 μm, about 200 μm to about 300 μm, about 300 μm to about 400 μm, about 400 μm to about 500 μm, about 100 μm to about 400 μm or about 200 μm to about 300 μm.

Also provided is the composition as described above, wherein the one or more than one first component and the one or more than one organic rheology additive are present in a ratio from about 97:3 to about 99:1 (wt/wt).

Also described herein is a composition for increasing adhesion (an adhesion enhancement composition) between two surfaces that are in sliding or rolling-sliding contact with each other the composition comprising:
one or more than one first component, each of the one or more than one first component having a Mohs hardness value of equal to or greater than 7 (or a Vickers hardness of greater than or equal to 1000), and
one or more than one second component, each of the one or more than one second component having a measurable Mohs hardness value of between about 1 to about 7 (or a Vickers hardness of between about 10 to about 1000), and characterized with an ability to absorb liquid,
wherein the one or more than one first component and the one or more than one second component are present in a ratio from about 1:1000 to about 1:0.1 (wt/wt). The adhesion enhancement composition exhibits an increase in adhesion between two surfaces in traction, sliding or rolling contact, when compared with the application of F50 sand at a same rate and under the same conditions.

The one or more than one second component may be selected from the group of a silica-based compound, a ferric oxide based compound, an amphoteric oxide based compound, an alkaline earth metal oxide based compound, a phyllosilicate based compound, an aluminosilicate compound, a porous or molecular sieve material, and a combination thereof. For example, the amphoteric oxide based compound may be selected from the group of aluminum, zirconium, iron, zinc, magnesium, silicon, the silica based compound may be selected from the group of crystalline silica, sand, amorphous silica, silica gel, synthetic precipitated silica, diatomaceous earth, the phyllosilicate based compound may be selected from the group of clay, mica, talc, the aluminosilicate compound may be selected from the group of minerals, zeolites, the porous or molecular sieve material may be selected from the group of silica gel, zeolites. Additional one of the one or more than one second components include a ferric oxide based compound, an alkaline earth metal oxide based compound, a zinc oxide based compound, an absorbent porous material, an alumina based compound, an organic polymer absorbent, and any combination thereof. For example, the one of the one or more than one second component may be a silica-based compound, for example a synthetic, amorphous, precipitated, silica thixotrope thickening agent (HI-SIL™ T800 silica) or a silica gel, an aluminosilicate for example a zeolite or a molecular sieves, an alumina based product for example boehmite, alumina monohydrates, AlOOH, bayerite, $Al(OH)_3$ (Disperal® products), or an organic polymer absorbent, for example an acrylic, a superabsorbent polymer, or a cellulosic material for example carboxymethyl cellulose (CMC), carboxy-hydroxymethyl cellulose (CHMC; METHOCEL™), ethoxymethyl cellulose (EMC), any combination thereof.

The present disclosure also provides the composition as described above wherein the composition comprises one, of the one or more than one first component, and one, of the one or more than one second component. The one or more than one first component and the one or more than one second component may be present in a ratio of about 1:1000, about 1:900, about 1:800, about 1:750, about 1:700, about 1:600, about 1:500, about 1:400, about 1:300, about 1:250, about 1:200, about 1:150, about 1:100, about 1:75, about 1:50, about 1:25, about 1:15, about 1:10, about 1:9, about 1:8, about 1:7, about 1:6, about 1:5, about 1:4, about 1:3, about 1:2, about 1:1, about 1:0.9, about 1:0.8, about 1:0.7, about 1:0.6, about 1:0.5, about 1:0.4, about 1:0.3, about 1:0.2, about 1:0.1 (wt/wt), or any amount therebetween. For example, the ratio may be about 1:10, about 5:95, about 10:90, about 15:85, about 30:70, about 50:50, about 70:30, or about 90:10 (wt/wt) or any amount therebetween.

Also provided is the composition as described above, wherein the one or more than one first component and the one or more than one second component have a particle size of from about 1 μm to about 1600 μm. For example, the particle size may be from about 1 μm to about 30 μm.

A method (A) of increasing adhesion between two steel surfaces in traction, sliding-rolling contact is also described. The method comprises, applying an adhesion enhancement composition comprising one or more than one first component, each of the one or more than one first component having a Mohs hardness value of equal to or greater than 7 (or a Vickers hardness of greater than or equal to 1000), and one or more than one organic rheology additive, wherein the one or more than one first component and the one or more than one organic rheology additive are present in a ratio from about 90:10 to about 99.9:01 (wt/wt), and wherein the composition does not comprise water, to the rail surface at a rate sufficient to increase the adhesion between the two steel surfaces, when compared to the adhesion determined between the two steel surfaces in the absence of application of the adhesion enhancement composition. As also shown herein, the adhesion enhancement composition exhibits an increase in adhesion when compared with the application of the first component at a same rate and under the same conditions.

Also described herein is a method (B) of increasing adhesion between two steel surfaces in sliding-rolling contact comprising applying a material characterized as having a Mohs hardness value of 1 to 10 (or a Vickers hardness between about 10-2250); and an ability to absorb from 20 to 1,000 g water or oil per 100 g of the material, to one or both of the steel surfaces, at a rate sufficient to increase the adhesion between the two steel surfaces, when compared to the adhesion determined between the two steel surfaces in the absence of application of the adhesion enhancement composition. As also shown herein, the adhesion enhancement composition exhibits an increase in adhesion when compared with the application of F50 sand at a same rate and under the same conditions. The material used in method (B) may further be characterized as having a particle size from about 0.1-200 μm.

A composition for increasing adhesion between two surfaces that are in traction, sliding or rolling-sliding contact with each other is also described. The composition comprises a mixture that increases adhesion, the mixture consisting of one or more than one first component, each of the one or more than one first component having a Mohs hardness value of equal to or greater than 7 (or a Vickers hardness of greater than or equal to 1000), and one or more than one organic rheology additive, wherein the one or more than one first component and the one or more than one rheology are present in a ratio from about 90:1 to about 99.9:01 (wt/wt), and wherein the composition does not comprise water.

Also described is a method (C) of decreasing wheel slide and wheel slip in a rail system. The method (C) comprises applying a composition comprising one or more than one first component, each of the one or more than one first component having a Mohs hardness value of equal to or greater than 7 (or a Vickers hardness of greater than or equal to 1000), and one or more than one organic rheology additive, wherein the one or more than one first component and the one or more than one organic rheology additive are present in a ratio from about 90:1 to about 99.9:01 (wt/wt), and wherein the composition does not comprise water, to a rail surface at a rate sufficient to increase traction between a wheel and the rail surface.

Additionally, a method (D) of decreasing wheel slide and wheel slip in a rail system that comprising applying a material characterized as having a Mohs hardness value of about 1 to about 10 (or a Vickers hardness of between about 10 to about 2250); and an ability to absorb from 20 to 1,000 g water, or oil, per 100 g of the material, to one or both of the steel surfaces at a rate sufficient to increase traction between a wheel and the rail surface is also described. Also described is a method of increasing adhesion between two steel surfaces in sliding-rolling contact comprising applying one or more than one component, each of the one or more than one component having a measurable Mohs hardness value of between about 1 to about 7, or a Vickers hardness of between about 10 and about 1000, and characterized with an ability to absorb liquid, to a rail surface at a rate sufficient to increase the adhesion between the two steel surfaces. The one or more than one component may be one or more than one organic material or one or more than one inorganic porous material.

The adhesion enhancement composition as described herein performs over a wide range of applied quantities and against a wide range of contaminants that lead to low adhesion conditions, including water, dew, water debris mixtures, snow, leaves, leaf-water mixtures, oil, grease, and other debris. The degree of adhesion enhancement obtained using the compositions described herein are greater than that observed using locomotive sand, for example, F50 sand, when applied under the same or similar conditions. The composition may be formulated in a manner that is easy to apply (for example a powder, a paste, formulated as a film, or formulated in a solid stick) and that ensures uniform distribution on the rail or wheel surface. Furthermore, the composition may be applied using standard dispensing mechanisms, nozzles, or applicators similar to those used to apply sand, or those described in U.S. Pat. No. 7,311,274. Additionally, if the adhesion enhancement material or composition is applied in a paste or liquid form, then the adhesion enhancement material or composition may be applied using a wayside system as described in U.S. Pat. Nos. 7,273,131, 8,955,645, WO2011/143765 or WO2013/067628. Furthermore, the composition may be retained on the rail or wheel surface for a longer period of time when compared to the length of time F50 sand (or locomotive sand) is retained on the rail surface, and the amount of wear of the track surface is reduced when using the composition as described herein, when compared to the rate of wear when using F50 sand.

The adhesion enhancement compositions defined above may therefore be suitable for use as an adhesion enhancing agent and applied to a steel surface when the surface is exposed to water, dew, snow, contaminated water, debris (organic matter, leaves), liquid (e.g. oil, grease, water-oil/grease mixtures) contaminated conditions, or the surface is exposed to other contaminating conditions. The adhesion enhancement composition described herein may be applied locally, for quick, localized treatment of a rail, wheel or both the rail and wheel surface in order to address a low adhesion level.

This summary does not necessarily describe the entire scope of all aspects of the disclosure. Other aspects, features and advantages will be apparent to those of ordinary skill in the art upon review of the following description of specific embodiments.

BRIEF DESCRIPTION OF THE DRAWINGS

These and other features of the present disclosure will become more apparent from the following description in which reference is made to the appended drawings.

DETAILED DESCRIPTION

Figure 1A:
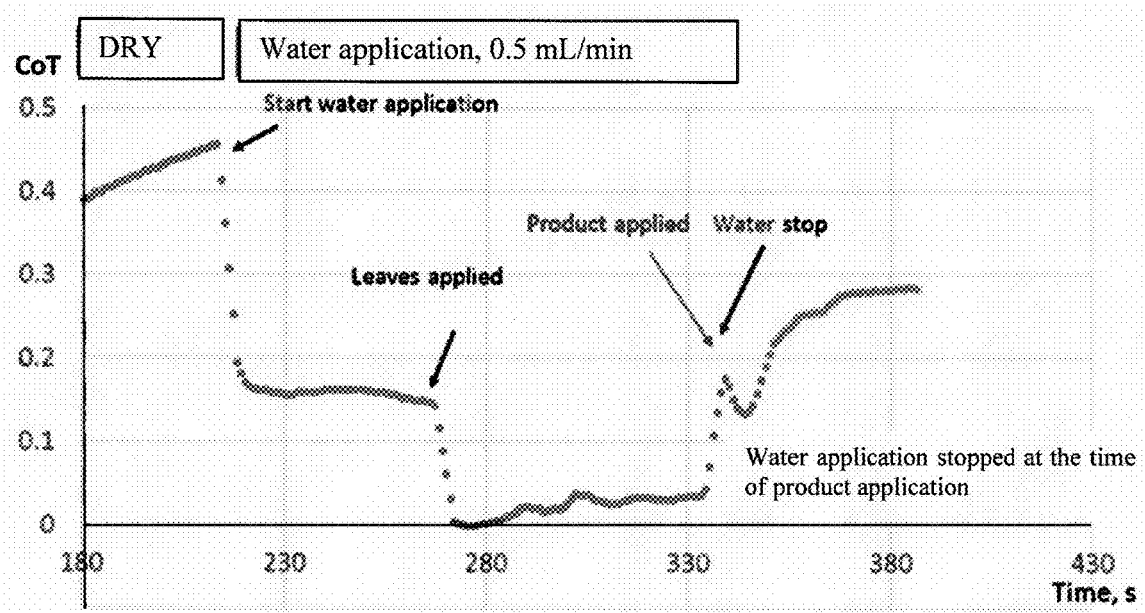
FIG. 1(a) shows a graphical representation of an example time course of a twin disc analysis as described herein, where the contaminant is leaves. The change in the coefficient of traction (CoT), between the rotating discs over the initial 10 seconds after "product applied", was used to determine the efficacy of the applied material or composition as an adhesion enhancer, under a contaminated condition. "DRY"—the twin disc machine was run under dry conditions at 500 rpm, 3.6 kN load (1033 MPa) and 1.5% creep for 500 cycles; "Water application"—water was added to the contact area of the rotating discs (0.5 mL/min) and the disks run for 500 cycles; "Leaves applied"—the contaminant was applied to the rotating discs with the continued addition of water for 500 cycles; "Product applied"—an adhesion enhancement material or composition was applied to the rotating discs and water application was stopped, and the disks were run for 500 cycles.

The present invention relates to adhesion enhancement compositions for applying to steel surfaces that are in traction, sliding or rolling-sliding contact. Methods for enhancing adhesion between two steel surfaces in sliding rolling contact are also provided.

The present disclosure relates to adhesion enhancement compositions for applying to surfaces that are in traction, sliding or rolling-sliding contact with each other, and methods of using the adhesion enhancement compositions. A non-limiting example of a traction, sliding or rolling-sliding contact system is a train wheel and rail system. For simplicity, but without wishing to be bound only to such a system, portions of this disclosure may be discussed in the context of a train wheel and rail system. A skilled person in the art would readily understand that a train wheel and rail system is a non-limiting example of a system comprising surfaces that are in traction, sliding or rolling-sliding contact with each other, and that the compositions disclosed herein may be applicable generally to any system comprising surfaces which are in traction, sliding or rolling-sliding contact with each other. The enhancement of adhesion of the adhesion composition may be observed by comparing application of the adhesion enhancement composition with the application of F50 sand to a wheel-rail system when both compositions are applied at the same rate and under the same conditions.

A composition for increasing or enhancing adhesion between two surfaces that are in sliding or rolling-sliding contact with each other is described herein. The composition comprises one or more than one first component, where each of the one or more than one first component is characterized as having a Mohs hardness value of equal to or greater than 7 (or a Vickers hardness of greater than or equal to 1000), and one or more than one organic rheology additive. The one or more than one first component and the one or more than one organic rheology additive are present in a ratio of between about 90:10 to about 99.9:0.1 (wt/wt) or any amount therebetween. For example, the one or more than one first component and the one or more than one organic rheology additive are present in a ratio of between about 90:10, about 91:9, about 92:8, about 93:7, about 96:4, about 95:5, about 96:4, about 97:3, about 98:2, about 99:1, about 99.9:0.1 (wt/wt) or any amount therebetween. The composition may not comprise water.

Also described herein is the use of the adhesion enhancement composition comprising the one or more than one first component and the one or more than one organic rheology additive for increasing adhesion between two steel surfaces in traction, sliding rolling contact. The enhancement of adhesion of the adhesion composition may be observed by comparing application of the adhesion enhancement composition with the application of the first component to a wheel-rail system, when both compositions are applied at the same rate and under the same conditions.

The composition may also comprise one or more than one first component, where each of the one or more than one first component is characterized as having a Mohs hardness value of equal to or greater than 7 (or a Vickers hardness of greater than or equal to 1000), and one or more than one second component, with each of the one or more than one second component having a Mohs hardness value of between about 1 to about 7 (or a Vickers hardness of between about 10 to about 1000). Furthermore, the one or more than one second component is characterized as having an ability to absorb a liquid. The one or more than one first component and the one or more than one second component are present in a ratio of between about 1:1000 to about 1:0.1 (wt/wt) or any amount therebetween. For example, the one or more than one first component and the one or more than one second component are present in a ratio of between about 1:1000, 1:950, 1:900, 1:850, 1:800, 1:750, 1:700, 1:650, 1:600, 1:550, 1:500, 1:450, 1:400, 1:350, 1:300, 1:250, 1:200, 1:150, 1:100, 1:75, 1:50, 1:25, 1:20, 1:15, 1:14, 1:13, 1:12, 1:11, 1:10, 1:9, 1:8, 1:7, 1:6, 1:5, 1:4, 1:3, 1:2, 1:1, 1:0.9, 1:0.8, 1:0.7, 1:0.6, 1:0.5, 1:0.4, 1:0.3, 1:0.2, 1:0.1 (wt/wt) or any amount therebetween, or for example, about 1:10, about 5:95, about 10:90, or about 15:85 (wt/wt). The one or more than one second component may be organic.

Also described herein is the use of the adhesion enhancement composition comprising the one or more than one first and second component for increasing adhesion between two steel surfaces in traction, sliding rolling contact. The enhancement of adhesion of the adhesion composition may be observed by comparing application of the adhesion enhancement composition with the application of F50 sand to a wheel-rail system, when both compositions are applied at the same rate and under the same conditions.

Also described herein is a method of increasing adhesion between two steel surfaces in sliding-rolling contact comprising, applying a material characterized as having a Mohs hardness value of about 1 to about 10 (or a Vickers hardness of between about 10 to about 2250), although materials having a Mohs hardness less than 1 or greater than 10 may also be used; and an ability to absorb from 20 to 1,000 g water per 100 g of the compound, to one or both of the steel surface, at a rate sufficient to increase the adhesion between the two steel surfaces, when compared to the adhesion determined between the two steel surfaces in the absence of application of the adhesion enhancement composition. As also shown herein, the adhesion enhancement composition exhibits an increase in adhesion when compared with the application of F50 sand at a same rate and under the same conditions. For example, a material that exhibits a Mohs hardness value of equal to or greater than 2, an ability to absorb a liquid may, for example, absorb from 20 to 1,000 g water per 100 g of the material, and have a particle size from about 0.1-200 µm, may be used as an adhesion enhancement agent. The material may be an organic material or an inorganic porous material. The organic material may be a xanthan gum, a guar gum, an organic polymer absorbent, a cellulosic material, a polysaccharide and a combination thereof. The inorganic porous material may be amorphous silica, diatomaceous earth, silica gel, synthetic precipitated silica or a zeolite.

A composition for increasing adhesion (an adhesion enhancement composition) between two surfaces that are in traction, sliding or rolling-sliding contact with each other is also disclosed. The composition comprises a mixture that increases adhesion enhancement, the mixture consisting of one or more than one first component, each of the one or more than one first component having a Mohs hardness value of equal to or greater than 7 (or a Vickers hardness of greater than or equal to 1000), and one or more than one second component, each of the one or more than one second component having a measurable Mohs hardness value of between about 1 to about 7 (or a Vickers hardness of between about 10 to about 1000), and characterized with an ability to absorb liquid, wherein the one or more than one first component and the one or more than one second component are present in a ratio from about 1:1000 to about 1:0.1 (wt/wt). The adhesion enhancement composition exhibits an increase in adhesion between two surfaces in traction, sliding or rolling contact, when compared with the application of F50 sand at a same rate and under the same conditions.

The dual-action properties of the adhesion enhancement agent, either a material or a composition as described herein, provide an improved rate of traction coefficient increase between surfaces that are in traction sliding or rolling-sliding contact with each other over typical compounds such as railroad sand (F50 sand).

The adhesion enhancing compositions described herein may also comprise an antiwear additive in an amount from 0 to about 10% (wt/wt), or any amount therebetween, of the final composition. Examples of antiwear additives which are not to be considered limiting in any manner include sulfur based additives, phosphorus based additives, zinc dialkyldithiophosphates; molybdenum disulfide, tungsten disulfide, graphite, or a combination thereof.

The adhesion enhancing compositions described herein may also comprise a conductivity additive in an amount from 0 to about 10% (wt/wt), or any amount therebetween, of the final composition. Examples of conductivity additives which are not to be considered limiting in any manner include carbon black, graphite, metal power or a combination thereof. The conductivity additive may have a particle size less than 500 µm.

The adhesion enhancing compositions described herein may also comprise any one or more of an anti-dust or anti-static additive or additives to control pH and chelation in an amount from 0 to about 10% (wt/wt) for each additive, or any amount therebetween, of the final composition.

As used herein, the terms "comprising", "having", "including", and "containing", and grammatical variations thereof, are inclusive or open-ended and do not exclude additional, un-recited elements and/or method steps. The term "consisting essentially of" when used herein in connection with a composition, use or method, denotes that additional elements, method steps or both additional elements and method steps may be present, but that these additions do not materially affect the manner in which the recited composition, method or use functions. The term "consisting of" when used herein in connection with a composition, use or method, excludes the presence of additional elements and/or method steps.

Any element expressed in the singular form also encompasses its plural form. Any element expressed in the plural form also encompasses its singular form. The use of the word "a" or "an" when used herein in conjunction with the term "comprising" may mean "one", but it is also consistent with the meaning of "one or more", "at least one", and "one or more than one". Directional terms such as "top", "bottom", "upwards", "downwards", "vertically", and "laterally" are used in the following description for the purpose of providing relative reference only, and are not intended to suggest any limitations on how any article is to be positioned during use, or to be mounted in an assembly or relative to an environment.

As used herein, the term "about" when followed by a recited value means plus or minus 10% of the recited value.

As used herein, the term "creepage" between two steel surfaces in sliding/rolling contact is the percentage difference between the magnitude of the velocity of the sliding movement of a rail relative to the magnitude of the tangential velocity of the wheel at the point of contact between wheel and rail, assuming a stationary zone of contact and a dynamic rail and wheel.

As used herein, the term "positive friction characteristic" means that the coefficient of friction between two surfaces in sliding or rolling-sliding contact increases as the creepage between the two surfaces increases.

By the term a "first component" it is meant a material that is characterized as having a Mohs hardness value of equal to or greater than 7, or a Vickers hardness of greater than or equal to 1000. The first component may also be termed an "abrasive agent". Examples of a first component include but are not limited to boron carbide, boron carbide black #280, silicon carbide, alumina zirconia, aluminium oxide white, brown aluminium oxide #280, silicon carbide black #280, alumina calcined #A-12 #325, or a combination thereof. Examples of a first component, having a Mohs hardness value of greater than 7 are provided in Table 1.

between about 10 to about 1000. The second component may also be termed an "absorptive agent". By able to "absorb a liquid", it is meant that the material is capable of absorbing, for example but not limited to, water, dew, snow, water mixtures, contaminated water, oil, grease, or a combination thereof. For example, if the liquid is water, or oil, then the second component may absorb from about 10 to about 1,000 g of water, or oil, per 100 g of the second component, or any amount therebetween (see Table 2 for a range of water, or oil, absorption values). For example, if the liquid is water, or oil, then the second component may absorb from about 10, 12, 14, 16, 18, 20, 22, 24, 26, 28, 30, 32, 34, 36, 38, 40, 42, 44, 46, 48, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000 g water, or oil, per 100 g of the second component, or any amount therebetween. However, the second component may also be characterized by its ability to absorb oil, oil/water mixtures and the like, for example from about 5 to about 1,000 g oil per 100 g of the second component, or any amount therebetween (see Table 2 for a range of oil absorption values). For example, the second component may absorb from about 5, 7, 10, 12, 14, 16, 18, 20, 22, 24, 26, 28, 30, 32, 34, 36, 38, 40, 42, 44, 46, 48, 50, 55, 60, 65, 70, 75, 80, 85, 90, 95, 100, 120, 140, 160, 180, 200, 220, 240, 250,

| Material | Description | Average Particle size (μm)** | Hardness (Mohs)** | Vickers Hardness (HV)** | Oil absorptivity (g/100 g*) | Water absorption (g/100 g*) |
| --- | --- | --- | --- | --- | --- | --- |
| Rail Sand | Silica sand | 2000 | 7 | 1161 | 3.8 | 26.6 |
| F-50 Silica Sand | Silica sand | 210 | 7 | 1161 | 3.0 | 28.1 |
| Silica Sand #20-30 | Silica sand | 707 | 7 | 1161 | 2.0 | 19.0 |
| Silica Sand #35-50 | Silica sand | 420 | 7 | 1161 | 4.0 | 17.6 |
| Silica Sand #50-80 | Silica sand | 297 | 7 | 1161 | 4.9 | 25.7 |
| Silica Sand #70-100 | Silica sand | 210 | 7 | 1161 | 6.8 | 26.6 |
| Silica Sand #100-140 | Silica sand | 149 | 7 | 1161 | 9.3 | 26.4 |
| Silica Sand #140-270 | Silica sand | 74 | 7 | 1161 | 11.1 | 30.7 |
| Zirblast #B40 (#40/60) | ZrO2 | 3377 | 7.2 | 1237 | 5.5 | 21.7 |
| Alumina Zirconia #240 | Al2O3/ZrO2 | 17 | 8.5 | 1793 | 8.8 | 24.9 |
| Aluminum oxide white | Al2O3 | 100 | 9 | 2034 | 18.0 | 28.3 |
| Alumina calcined #A-12 #-325 | Al2O3 | 12 | 9 | 2034 | 37.3 | 43.4 |
| Boron Carbide Black #280 | Boron carbide | 29.5 | 9 | 2034 | 14.8 | 36.1 |
| Brown Al$_2$O$_3$ #280 | Al2O3 | 39.5 | 9 | 2034 | 8.0 | 25.3 |
| Silicon Carbide Black #280 | Silicone carbide | 280 | 9.5 | 2034 | 12.5 | 30.7 |

*g of liquid/100 g of material
**approximate

As used herein, an "organic rheology additive" is a material substantially comprising carbon that is able to act as a thickener to change the rheology of water pastes or slurries, which form upon application of the adhesion enhancing composition to a surface having water contamination on its surface, such that the water slurry becomes more viscous. Non-limiting examples of the organic rheology additive include an organic polymer absorbent, an acrylic, a superabsorbent polymer, a cellulosic material (for example, carboxymethyl cellulose (CMC), carboxy-hydroxymethyl cellulose (CHMC; METHOCEL™), ethoxymethyl cellulose (EMC)), a polysaccharide, a xanthan gum (for example, Vanzan™ (for example, Vanzan™ D)), a guar gum, or any combination thereof.

As used herein, a "second component" is a material that is able to absorb a liquid, and that has a Mohs hardness value of between about 1 to about 7, or a Vickers hardness of 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000 g oil per 100 g of the second component, or any amount therebetween. Examples of oil and water absorptivity values for a range of materials that may function as a second component in the adhesion enhancement compositions described herein are provided in Table 2. The second component may be an organic material or an inorganic porous material. For example, the organic material may be a xanthan gum, a guar gum, an organic polymer absorbent, a cellulosic material, a polysaccharide or a combination thereof. For example, the inorganic porous material may be an amorphous silica, diatomaceous earth, silica gel, synthetic precipitated silica or a zeolite.

Oil absorption may be measured for example, using the method described by ASTM D281. As an example, an oil, for example vegetable oil or linseed oil, is added to a defined amount of a material being tested, and the mixture is rubbed with a spatula to form a stiff paste. From the weight of the material being tested and the weight of the added oil added to form a stiff paste, the amount of added oil (in grams) per 100 g of the material may be determined. Water absorption may be measured in a similar way using water in place of the oil. Alternatively, water absorption may be determined using ASTMD570. Using this method, a material of interest is dried in an oven for a specified time and temperature and then placed in a desiccator to cool. Immediately upon cooling the material is weighed and emerged in water at 23° C. for 24 hours (or until equilibrium). The specimen is removed, patted dry with a lint free cloth, and weighed.

Non-limiting examples of the second component include a silica-based compound, a ferric oxide based compound, an amphoteric oxide based compound, an alkaline earth metal oxide based compound, a phyllosilicate based compound, an aluminosilicate compound, a porous or molecular sieve material, and a combination thereof. For example, the amphoteric oxide based compound may be selected from the group of aluminum, zirconium, iron, zinc, magnesium, silicon, the silica based compound may be selected from the group of crystalline silica, sand, amorphous silica, silica gel, synthetic precipitated silica, diatomaceous earth, the phyllosilicate based compound may be selected from the group of clay, mica, talc, the aluminosilicate compound may be selected from the group of minerals, zeolites, the porous or molecular sieve material may be selected from the group of silica gel, zeolites. Additional second components may include a ferric oxide based compound, an alkaline earth metal oxide based compound, a zinc oxide based compound, an absorbent porous material, an alumina based compound, an organic compound and any combination thereof. For example, the second component may be a synthetic, amorphous, precipitated silica thixotrope (HI-SIL™ T800 silica), or a silica gel, an alumina based product for example boehmite, alumina monohydrates, AlOOH, bayerite, $Al(OH)_3$ (Disperal® products), or an organic polymer absorbent, for example an acrylic, a superabsorbent polymer, or a cellulosic material for example carboxymethyl cellulose (CMC), carboxy-hydroxymethyl cellulose (CHMC; METHOCEL™), ethoxymethyl cellulose (EMC), Lo-Vel27™, iron oxide Bayferrox® 340 (synthetic iron oxide pigment), magnesium oxide, zinc oxide, Kamin 70C kaolin, Kamin 90 kaolin, Garnet #30-60, Nicron® 604 (talc), Volclay® bentonite, mica C-4000, mica CD-3200, mica Suzorite® 60Z, LB-1011 carbon black, Attagel® (an attapulgite or palygorskite; magnesium aluminum phyllosilicate; $(Mg,Al)_2Si_4O_{10}(OH)_4(H_2O)$); Attagel® 19, Attagel® 50, Disperal® HP14/7, $BaSO_4$ Cimbar XF, calcium carbonate, magnesium sulfate, Zeomax 30LM (zeolite), vermiculite, swellable clay, zeolite, type A, X, Y, ZSM-5, silicate L, or any combination thereof.

Examples of a second component having a Mohs harness value of 1-7 (a Vickers hardness of between about 10 to about 1000) are provided in Table 2.

| Material | Description | Average Particle size (μm)** | Hardness (Mohs)** | Vickers Hardness (VH)** | Oil absorptivity (g/100 g*) | Water absorption (g/100 g*) |
|---|---|---|---|---|---|---|
| Nicron ® 604 Talc | Talc | 2.4 | 1 | 27 | 60.9 | 97.3 |
| Mistron ® ZSC talc | Surface treated talc | Not Available | 1 | 27 | 69.6 | 175.5 |
| Nicron ® 353 Talc | Talc | 6.3 | 1 | 27 | 36.3 | 64.0 |
| Volclay ® bentonite | Bentonite clay | 74 | 1.5 | 36 | 24.3 | 82.5 |
| Mica CD-3200 | Mica material | 22 | 2 | 61 | 45.9 | 45.8 |
| KCl | KCl | Not Available | 2 | 61 | 9.3 | 24.3 |
| Mica C-4000 | Mica material | 17 | 2.5 | 102 | 74.4 | 99.4 |
| Kamin 90 Kaolin | Kaolin clay | 1.5 | 2.5 | 102 | 55.8 | 32.9 |
| Polyplate ® HMT Kaolin | Kaolin clay | 6.7 | 2.5 | 102 | 43.9 | 40.0 |
| Attagel ® 19 | Attapulgite clay | Not Available | 2.5 | 102 | 69.2 | 140.2 |
| Attagel ® 30 | Attapulgite clay | 13 | 2.5 | 102 | 81.9 | 129.6 |
| Attagel ® 50 | Attapulgite clay | 9 | 2.5 | 102 | 108.5 | 153.1 |
| $CuSO_4*5H_2O$ | $CuSO_4*5H_2O$ | Not Available | 2.5 | 102 | 5.4 | 26.4 |
| Baking soda | Baking soda | Not Available | 2.5 | 102 | 14.9 | 24.6 |
| Zeomax 30LM | Zeolite | Not Available | Not Available | 102 | 44.5 | 50.2 |
| Zeomax 30T | Zeolite | Not Available | Not Available | 102 | 37.4 | 53.0 |
| Suzorite ® 60-S | Mica material | 420 | 3 | 157 | 65.9 | 47.6 |
| Disperal ® 40 | Boehmite | 0.5 | 3 | 157 | 69.9 | 66.2 |
| Disperal ® HP14/7 | Boehmite | Not Available | 3 | 157 | 110.0 | 152.7 |
| Suzorite ® 40-S | Mica material | 2000 | 3 | 157 | 47.2 | 47.2 |
| Mica Suzorite ® 150S | Mica material | 150 | 3 | 157 | 71.7 | 115.8 |
| Mica Suzorite ® 60Z | Mica material | Not Available | 3 | 157 | 20.8 | 48.0 |
| $Al(OH)_3$ | $Al(OH)_3$ | Not Available | 3 | 157 | 20.3 | 33.7 |
| $MgSO_4$ | $MgSO_4$ | Not Available | 3 | 157 | 42.8 | |
| $CaCO_3$ | $CaCO_3$ | Not Available | 3 | 157 | 12.5 | 18.2 |
| Cimbar XF | $BaSO_4$ | 3 | 3.5 | 229 | 12.9 | 16.8 |
| Kamin 70C | Kaolin clay | 3.2 | 4.5 | 418 | 71.4 | 59.6 |

-continued

| Material | Description | Average Particle size (μm)** | Hardness (Mohs)** | Vickers Hardness (VH)** | Oil absorptivity (g/100 g*) | Water absorption (g/100 g*) |
|---|---|---|---|---|---|---|
| ZnO | ZnO | Not Available | 4.5 | 418 | 36.4 | 48.2 |
| MgO | MgO | 100 | 4.8 | 418 | 53.1 | 58.8 |
| Vansil ® W-50 | Wollastonite | 4 | 5 | 535 | 38.2 | 67.7 |
| Lo-Vel ™ 2023 | Amorphous silica | 8.0 | 5.5 | 669 | 98.4 | 342.8 |
| Hi-Sil ™ T-800 | Amorphous silica | 2.5 | 5.5 | 669 | 131.6 | 411.5 |
| Silica Gel | Amorphous silica | 132 | 5.5 | 669 | 91.2 | 148.5 |
| Lo-Vel ™ 27 | Amorphous silica | Not Available | 5.5 | 669 | 229.7 | 318.5 |
| Insectigone ® | Diatomaceous earth | Not Available | Not Available | 669 | Not Available | Not Available |
| Iron (II, III) oxide | Fe3O4 | 5 | 6 | 817 | 31.6 | 56.6 |
| Iron (III) oxide | Fe2O3 | 5 | 6 | 1000 | 16.0 | 32.0 |
| Pirox100 | Fe3O4 | Not Available | 6 | 817 | 43.3 | 54.4 |
| Bayferrox ® 130 | Fe2O3 | 0.17 | 6 | 1000 | 28.3 | 32.9 |
| Bayferrox ® 340 | Fe3O4 | 0.15 | 6 | 817 | 24.4 | 29.7 |
| Bayferrox ® 110 | Fe2O3 | 6.7 | 6 | 1000 | 30.2 | 39.9 |
| Garnet #30-60 | Garnet | 50 | 6.5 | 982 | 5.1 | 16.7 |
| Bauxite #35/70 | Bauxite | 355 | 6.5 | 982 | 3.2 | 20.1 |
| KH2PO4 | KH2PO4 | Not Available | Not Available | Not Available | 15.8 | 29.0 |
| LB-1011 | Carbon Black | Not Available | Not Available | Not Available | 123.1 | 346.6 |
| AlphaCel ™ BH-65 | Cellulose | 50 | Not Available | Not Available | 156.1 | 392.6 |
| Black Diamond #30-60 | Coal slag | Not Available | Not Available | Not Available | 7.2 | 25.4 |

*g of liquid/100 g of material
**approximate

As also described herein, is the use of a material for increasing, or enhancing, adhesion between two steel surfaces in traction, sliding rolling contact, wherein the material exhibits both a Mohs hardness value of equal to or greater than 2 (or a Vickers hardness of greater than or equal to 60), an ability to absorb a liquid, for example absorbs from about 20 to 1,000 g water per 100 g of the material, or any amount therebetween, and a particle size between 0.1-200 μm. For example, the material is characterized as having a Mohs hardness of about 5, 5.2, 5.4, 5.6, 5.8, 6.0, 6.2, 6.4, 6.6, 6.8, 7.0, 7.2, 7.4, 7.6, 0.7, 8, 8.0, 8.2, 8.4, 8, 6, 8.8, 9.0, 9.2, 9.4, 9.6, 9.8, 10, or any amount therebetween (or the equivalent Vickers hardness value), an ability to absorb a liquid from about 20, 22, 24, 26, 28, 30, 32, 34, 36, 38, 40, 42, 44, 46, 48, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000 g water per 100 g of the material, or any amount therebetween, is characterized as having a small particle size of about 0.1, 0.5, 1.0, 2.0, 4.0, 6.0, 8.0, 10.0, 12.0, 14.0, 16.0, 18.0, 20.0, 25.0, 30.0, 35.0, 40.0, 45.0, 50.0, 55.0, 60.0, 65.0, 70.0, 75.0, 80.0, 85.0, 90.0, 95.0, 100, 120, 140, 160, 180 200 μm, or any amount therebetween, and that exhibits an rate of coefficient of traction (CoT) increase, when compared to the rate of coefficient of traction increase obtained using F50 sand.

Some formulations of the adhesion enhancing composition or material described herein may also comprise a material that exhibits a positive friction characteristic, for example but not limited to calcium carbonate, talc, magnesium carbonate, clay, silica, zinc oxide, aluminum oxide, iron oxide, magnesium oxide, zirconium oxide and the like.

Low adhesion tends to be a transitory problem negatively affecting train operation and safety. This means that a train may suddenly encounter low adhesion in a certain area of the track, or in a certain area of the track during certain periods of the day, or during certain seasons. This can affect either braking or traction. To counter such problems, the rate at which an applied material can increase transitorily low adhesion/traction conditions is an important parameter. Provided a material can rapidly increase wheel rail adhesion above a certain minimum level, the upper level may be less important. In addition too high a level of wheel rail adhesion (CoT) can promote excessive wear. For transit vehicles, the minimum level adhesion level for safe and effective operation (as measured on the train) is usually considered to be >0.1, preferably >0.15.

For "high adhesion" AC locomotives used in freight operation, the minimum level of adhesion (traction) is usually considered to be >0.30, or >0.40. On high adhesion locomotives for example with six axles, adhesion levels normally increases from the leading axle (the lowest adhesion) to the final axle. The adhesion enhancement materials or compositions described herein may act in a transient manner, and increase the adhesion levels on all axles but are effective on the first 3 axles bogie (in the case of a 6 axle locomotive).

By coefficient of traction it is meant the ratio of tangential traction force to normal force (T/N) in the contact area of two surfaces. In case of twin disc machine experiments as described herein, the CoT was calculated based on torque applied to the discs and the normal force. The materials and compositions described herein were selected as they were observed to provide a rapid increase in CoT under low adhesion conditions. Many materials exhibit high CoT under dry conditions but the same materials may provide a very slow increase in friction when applied under low adhesion conditions. Materials, or compositions comprising materials, that provide a slow increase in friction, may eventually provide high friction levels following application. However, the length of time to achieve the higher friction levels makes these materials, or compositions comprising these materials, not well suited for use under low adhesion conditions. Similarly, materials, or compositions comprising materials, that exhibit a slow increase in friction following application, and that may provide high friction levels over time, may also require higher application rates to achieve the desired adhesion enhancement effect, when compared to the application rates of the materials, or compositions comprising materials, as described herein. Materials that only provide high friction levels may also result in high wear rates of the wheel, rail, or both the wheel and rail surfaces. The adhesion enhancing materials, and compositions comprising the adhesion enhancement materials, that exhibit the properties as described herein, provide, in addition to an optional positive friction characteristic, a rapid increase in friction under low adhesion conditions to operational friction levels, which may vary depending on railroad regulations and operating conditions (traction or braking). This property (a rapid increase in the CoT) correlates with a minimum safe level of adhesion under field conditions. Furthermore, the materials, or compositions comprising materials as described herein also exhibit the property of not increasing wheel and/or track wear to the same extent as railroad sand (F50 sand).

By the term "adhesion" it is meant a force acting at the rail-wheel interface. Adhesion is a transmitted tangential force in the longitudinal direction between the railway wheel and the rail (see for example D. I. Fletcher, S. Lewis, Creep curve measurement to support wear and adhesion modelling, using a continuously variable creep twin disc machine, Wear. 298-299 (2013) 57-65). The tangential force may be reduced in the presence of contaminants for example, water, dew, water debris mixtures, water debris paste, snow, snow debris mixtures, high humidity, organic debris, leaves, ground leaves, ground leaves/water paste, oil, grease, or a combination thereof. Other factors may also impact adhesion for example, train speed (with the adhesion coefficient decreasing with increased speed), temperature of the steel surface (adhesion coefficient decreases with increased temperature), surface topography of the rail surface or wheel surface (smooth surfaces generally having a lower adhesion coefficient compared with rough surfaces). The adhesion enhancement composition described herein may be applied locally, for quick, localized treatment of a rail, wheel or both rail and wheel surface in order to address low adhesion.

Figure 8:
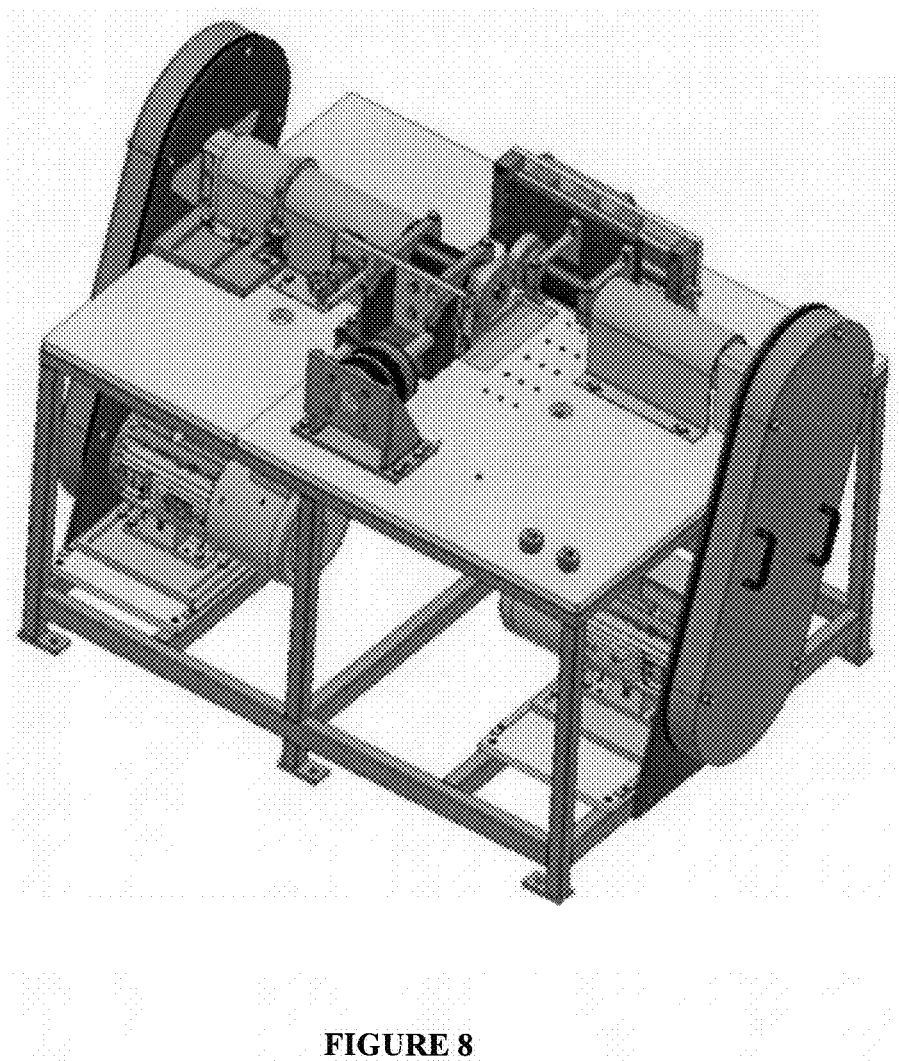
FIG. 8 shows a schematic view of a twin disc system as described herein.

Adhesion may be measured using several devices, for example, a train-mounted wheel slide and wheel slip detection system (e.g. detecting wheel rotation speed and any difference between of the rotation speeds of two wheels; U.S. Pat. Nos. 4,071,282; 3,867,647), or in a lab, a pin on disc machine, a ball on disc machine, a twin disk machine (e.g. Fletcher et. al., 2013), or a twin disc machine as described herein (see FIG. 8). Using the twin disc machine as described herein, adhesion may be characterized by evaluating the rate of change in the coefficient of traction (CoT), between the twin disks, following the application of a test material or component to the twin-disk machine. In this system, a rate of the CoT increase is an indicator of adhesion enhancement, or an increase in adhesion. The rate of change of the CoT following application of a test material may be compared with that of a standard or control material, for example sand. A greater increase in the rate of change of the coefficient of traction following application of a test material when compared to the control material (sand) is indicative of an increased or enhanced adhesion. Under field conditions, increased adhesion results in an increase in traction and reduced wheel slide and wheel slip. A rate of CoT increase 1/s between about 0.001 to about 0.039 or any amount therebetween, as determined using the twin disc apparatus described herein is indicative of a material or a composition comprising a material that is effect as an adhesion enhancement agent. For example, a rate of CoT increase 1/s between 0.001, 0.012, 0.014, 0.016, 0.018, 0.020, 0.022, 0.024, 0.026, 0.028, 0.030, 0.032, 0.034, 0.036, 0.038, 0.039 or any amount therebetween), is indicative of a material or a composition comprising a material that is effect as an adhesion enhancement agent.

The rate of change of traction was selected as a parameter to determine the effectiveness of a material, or composition, to increase adhesion between two steel surfaces. To be an effective material, the material should exhibit the property of rapidly increasing adhesion, as this property correlates to a minimally required level of adhesion for safe train operation. As noted above, the effectiveness of a material to increase adhesion is to be contrasted with a material that only generates a high friction level over a longer period of time following application.

Therefore, also described herein is a method of decreasing wheel slide and wheel slip in a rail system, comprising, applying a composition comprising, one or more than one first component, each of the one or more than one first component having a Mohs hardness value of equal to or greater than 7 (or a Vickers hardness of greater than or equal to 1000), and one or more organic rheology additive, wherein the one or more than one first component and the one or more than one rheology additive are present in a ratio from about 90:1 to about 99.9:0.1 (wt/wt), and wherein the composition does not comprise water, to a rail surface at a rate sufficient to increase traction between a wheel and the rail surface. The adhesion enhancement composition or material may be prepared in any suitable form including, but not limited to, a powder form, a powder coating, or as a solid stick in combination with a resin or other polymeric solid carrier. The composition or material may be applied using standard train mounted dispensing mechanisms, nozzles, or applicators similar to those used to apply sand, or those described in U.S. Pat. No. 7,311,274 or 6,722,589.

A method is also provided for decreasing wheel slide and wheel slip in a rail system, comprising, applying a composition comprising, one or more than one first component, each of the one or more than one first component having a Mohs hardness value of equal to or greater than 7 (or a Vickers hardness of greater than or equal to 1000), and one or more than one second component, each of the one or more than one second component having a measurable Mohs hardness value of between about 1 to about 7 (or a Vickers hardness of between about 10 to about 1000), and characterized with an ability to absorb liquid, wherein the one or more than one first component and the one or more than one second component are present in a ratio from about 1:1000 to about 1:0.1 (wt/wt), to a rail surface at a rate sufficient to increase traction between a wheel and the rail surface. In addition, a method is provided for decreasing wheel slide and wheel slip in a rail system, that comprises applying a material characterized as having a Mohs hardness value of about 1 to about 10 (or a Vickers hardness of between about 10 to about 2250); and an ability to absorb from 20 to 1,000 g water per 100 g of the material, to one or both of the steel surfaces at a rate sufficient to increase traction between a wheel and the rail surface.

This adhesion enhancement composition or material may be prepared in any suitable form including, but not limited to, a powder form, a powder coating, a film, a paste, a liquid, or as a solid stick in combination with a resin or other polymeric solid carrier. If the composition or material is formulated as a dry particle then the composition or material may be applied using standard train mounted dispensing mechanisms, nozzles, or applicators similar to those used to apply sand, or those described in U.S. Pat. No. 7,311,274 or 6,722,589. Additionally, if the adhesion enhancement material or composition is applied in a paste or liquid form, then the adhesion enhancement material or composition may be applied using a wayside system as described in U.S. Pat. Nos. 7,273,131, 8,955,645, WO2011/143765 or WO2013/067628 (each of which is incorporated herein by reference).

Low Adhesion Simulation

In the methods described herein, low adhesion conditions between two surfaces that are in sliding or rolling-sliding contact with each other may be simulated in a laboratory setting by using twin disc machine (see FIG. 8) and exposing the discs to a variety of low adhesion conditions. Both discs of the twin disk machine were obtained from premium rail and machined to a diameter of 50 mm with a contact track width of 10 mm. Tests were performed with one of the discs rotating at faster speed than the other to simulate wheelset acceleration/braking (creep). A nominal speed of about 500 rpm or about 20 rpm was used for the master disc, with an average maximum contact pressure of 1033 MPa (about 3.6 kN load), and about 1.5% creep for all tests.

Figure 1B:
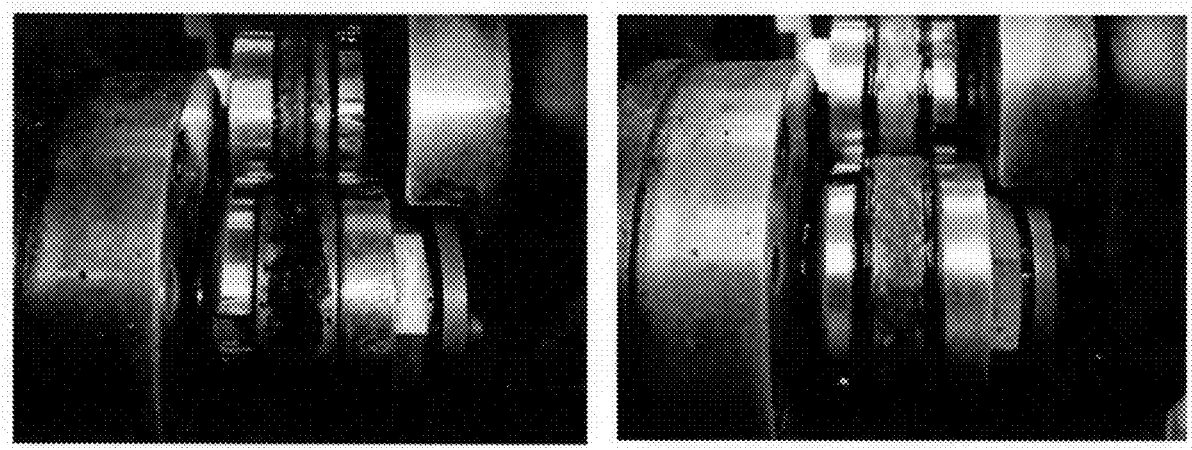
FIG. 1(b) shows a visual representation of a twin disc machine under water contaminated conditions during application of pure sand (left) and sand with Vanzan™ D in a ratio of 99:1 (right).

A visual representation of a twin disc machine under water contaminated conditions during application of pure sand (left) and sand with Vanzan™ D in a ratio of 99:1 (right) is shown in FIG. 1(b). There is a significant difference in visual appearance of the discs under water contamination conditions during application of pure sand or sand with organic rheology additive (Vanzan™ D xanthan gum) additive. In the latter case, a significant amount of water slurry gets squeezed out on the sides of the running band.

Figure 1C:
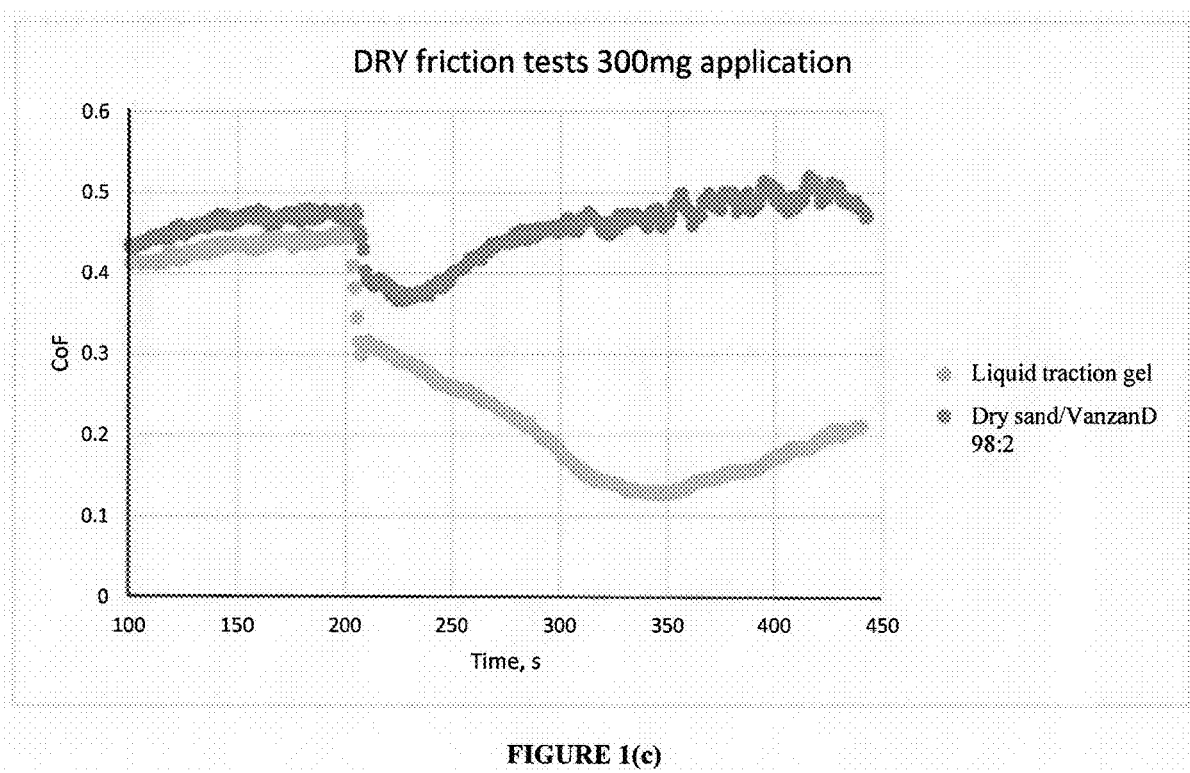
FIG. 1(c) shows a graphical representation of the change in the coefficient of traction (CoT) between rotating discs after application of a commercial liquid traction gel containing sand, water, solvents, thickener and additives, and after application of a mixture of dry sand with Vanzan™ D. The twin disc machine was run under dry conditions at 20 rpm, 1033 MPa contact pressure and 1.5% slip for 20 cycles, followed by application of 300 mg of adhesion enhancement material.

As shown in FIG. 1(c), which compares the rate of change of the coefficient of traction for a commercial traction gel, and a mixture of dry sand and Vanzan™ D in a ratio of 98:2 (wt/wt), addition of both dry sand mixed with Vanzan™ D and a commercial liquid traction gel resulted in an immediate initial drop in the CoT. However, the traction levels were restored significantly faster for the dry mixture due to the absence of water and/or solvents. This Example demonstrates the improved rate of traction coefficient increase between surfaces that are in traction sliding or rolling-sliding contact with each other following application of a dry adhesion enhancement composition comprising one or more than one first component and one or more than one organic rheology additive wherein the one or more than one first component and the one or more than one organic rheology additive are present in a ratio from about 90:1 to about 99.9:0.1.

Low Adhesion—Paper Contamination

Figure 2:
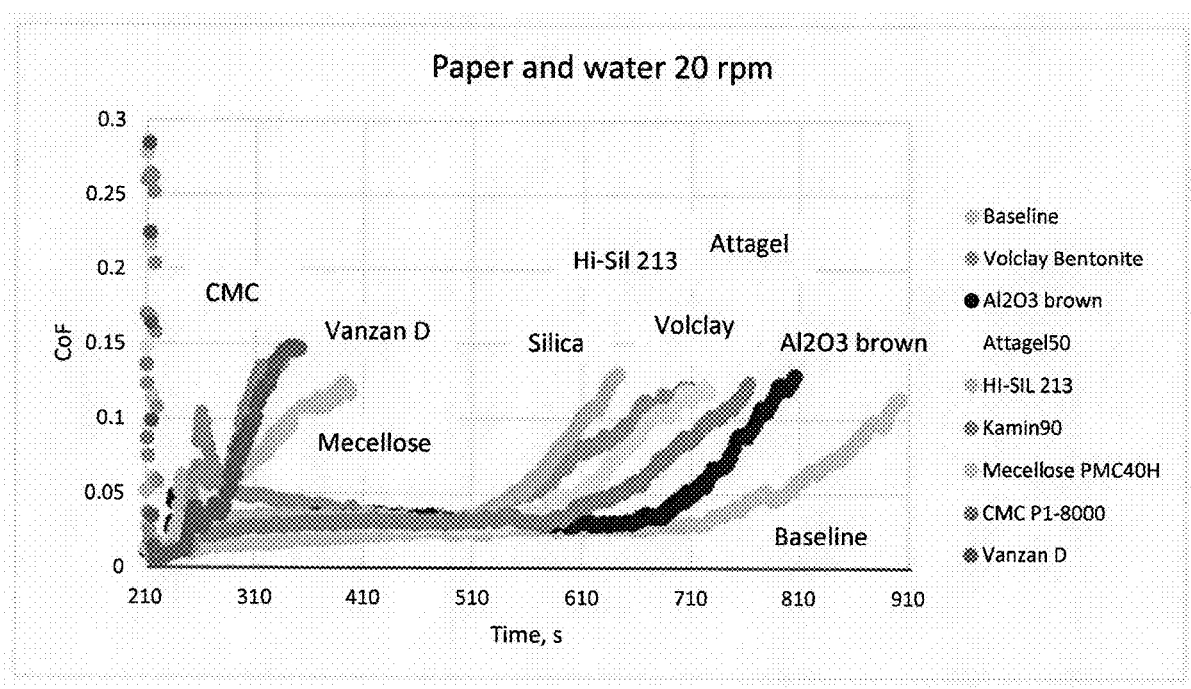
FIG. 2 shows a graphical representation of a rate of coefficient of traction (CoT) increase between two surfaces that are in traction, sliding or rolling-sliding contact with each other and contaminated with paper, upon application of 20 mg of different rheology additives to the contacting surfaces. The twin disc machine was run under dry conditions at 20 rpm, 1033 mPa contact pressure and 1.5% slip for 20 cycles. Water was added to the contact area of the rotating discs at a rate of 0.4 mL/min or 0.6 mL/min for 20 cycles. After the first 10 cycles of water application, a 160×20 mm paper strip was inserted between the discs. Water application was stopped and 20 mg of different rheology additives was then added. Application of the organic rheology additives resulted in a faster increase in CoT as compared to non-organic rheology additives.

With reference to FIG. 2, which shows a standard time course of a typical twin disc analysis with paper as the contaminant. For paper contamination simulations, the twin disc machine was run under dry conditions at 20 rpm, 1033 MPa contact pressure and 1.5% slip. Water was added to the contact area of the rotating discs at a rate of about 0.4 mL/min or 0.6 mL/min for 20 cycles. Addition of water resulted in a rapid drop in traction levels between the rotating discs. After 10 cycles of water addition, a 160×20 mm paper strip (paper was used for achieving low adhesion conditions with a CoT less than 0.1) was inserted between the discs with water application continuing. The rheology additive (20 mg) was then applied directly to the contact area of the rotating discs, and continuous water application was stopped at the same time. Addition of 20 mg of different rheology additives resulted in an initial increase in the CoT followed by a gradual decrease in the CoT before final traction level restoration. An increase in the rate of the coefficient of traction following application of the material or composition is an indicator of adhesion enhancement when compared to the application of sand under the same conditions. However, out of all the materials tested, application of polysaccharide thickeners, such as Mecellose PMC40H, CMC P1-8000 and Vanzan™ D resulted in significantly faster traction restoration (after approximately 300 s) in comparison to other materials (after 510 s).

Figure 3A:
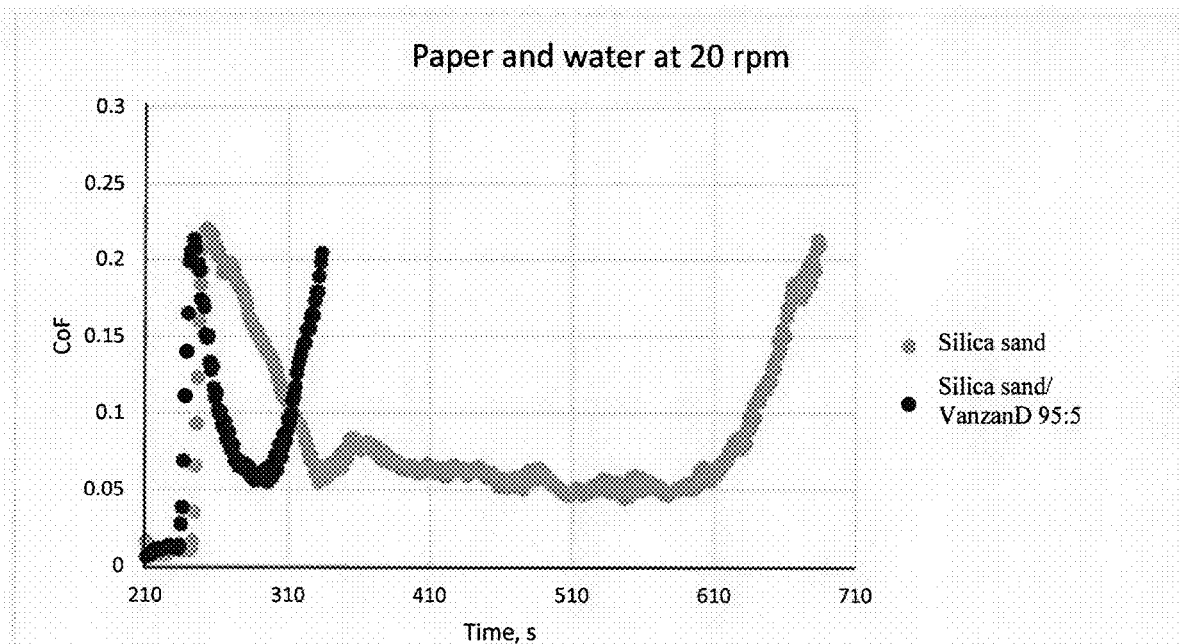
FIG. 3(a) shows a graphical representation of a rate of coefficient of traction (CoT) increase between two surfaces that are in traction, sliding or rolling-sliding contact with each other and contaminated with paper, upon application of 200 mg of silica sand and a composition comprising silica sand and Vanzan™ D in a ratio of 95:5. The twin disc machine was run under dry conditions at 20 rpm, 1033 MPa contact pressure and 1.5% slip for 20 cycles. Water was added to the contact area of the rotating discs at a rate of 0.6 mL/min for 20 cycles. Paper was added with water application for the last 10 cycles. Water addition was stopped and 200 mg of adhesion enhancement product was then applied. Only the final steps of the test are shown (210 s) after addition of paper.

With reference to FIG. 3(a), addition of pure sand resulted in an initial increase in the CoT followed by a gradual decrease in the CoT before final traction level restoration at approximately 210 s. Addition of sand mixed with Vanzan™ D xanthan gum (95:5 ratio) also resulted in an initial increase in the CoT followed by gradual decrease in the CoT, but final traction level restoration happened much faster after approximately 300 s.

Figure 3B:
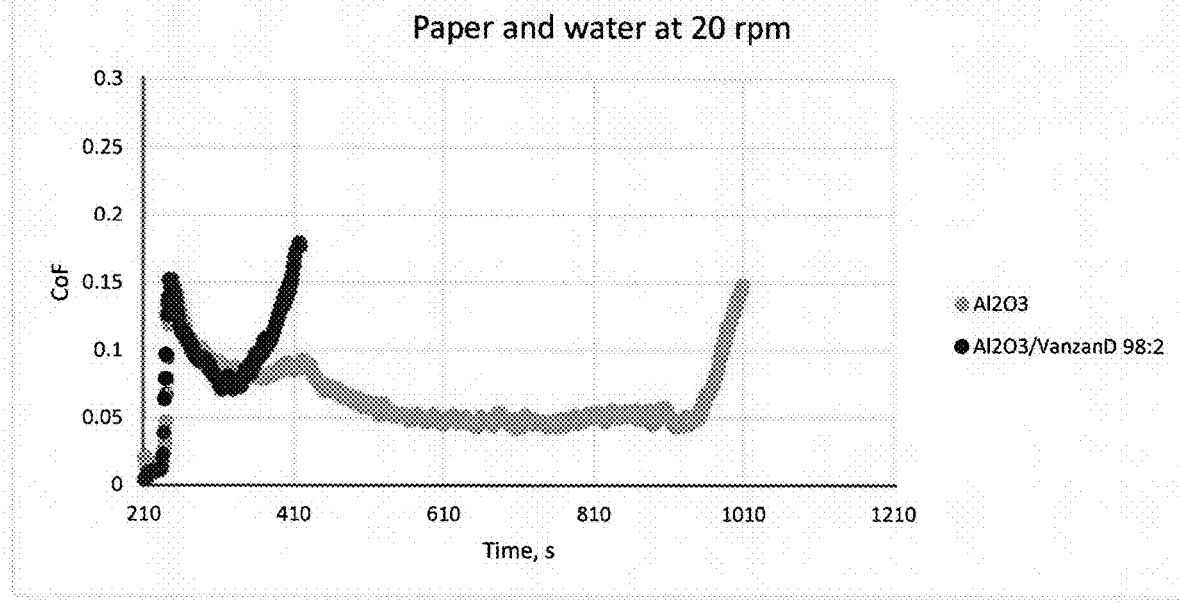
FIG. 3(b) shows a graphical representation of a rate of coefficient of traction (CoT) increase between two surfaces that are in traction, sliding or rolling-sliding contact with each other and contaminated with paper, upon application of 200 mg of $Al_2O_3$ and a composition comprising $Al_2O_3$ and Vanzan™ D in a ratio of 98:2 at the end of 20 cycles of water application. The twin disc machine was run under dry conditions at 20 rpm, 1033 MPa contact pressure and 1.5% slip for 20 cycles. Water was added to the contact area of the rotating discs at a rate of 0.6 mL/min for 20 cycles. Paper was added with water application for the last 10 cycles. Water application was stopped and 200 mg of adhesion enhancement material was then applied. Only the final steps of the test are shown (210 s) after addition of paper.

With reference to FIG. 3(b), addition of pure $Al_2O_3$ resulted in an initial increase in the CoT followed by a gradual decrease in the CoT before final traction level restoration after approximately 950 s. Addition of $Al_2O_3$ mixed with Vanzan™ D xanthan gum (98:2 ratio) at 230 s also resulted in an initial increase in the CoT followed by a gradual decrease in the CoT, but final traction level restoration happened much faster after approximately 340 s.

Low Adhesion—Leaf Contamination

With reference to FIG. 1(a), which shows a standard time course of a typical twin-disk analysis with leaf bits as the contaminant, the twin disc machine was run under dry conditions at 500 rpm, 3.6 kN load (1033 MPa) and 1.5% creep for 500 cycles to generate a layer of oxides and wear particles between the discs and a traction coefficient of between about 0.4 to about 0.6 between the discs. Water was added to the contact area of the rotating discs by using a syringe pump at a rate of about 0.5 mL/min. Addition of water resulted in a rapid drop in traction levels between the rotating discs. The discs were then run for another 500 cycles with continuous water application, until the traction coefficient between the rotating discs equilibrated at about 0.10 to about 0.25. Dry leaf bits (300 mg) of various sizes were then applied directly to the contact area of the rotating discs in the presence of the added water. The combination of dry leaf application and continuous water application resulted in a further drop in traction level between the two rotating discs. The rotating discs were run for another 500 cycles until the traction coefficient between the discs equilibrated at about 0.01 to about 0.05. The adhesion enhancement material or composition was then applied directly to the contact area of the rotating discs, and continuous water application was stopped at the same time. The discs were run for another 500 cycles, and the change in the rate of traction coefficient between the rotating discs over the initial 10 seconds post adhesion enhancement composition addition, was measured. From those measurements, a rate of traction coefficient increase (i.e. the increase or decrease in traction coefficient over the initial 10 seconds post adhesion enhancement addition) attributable to the application of a composition was derived. An increase in the rate of the coefficient of traction following application of the material or composition is an indicator of adhesion enhancement when compared to the application of sand under the same conditions.

The adhesion enhancement material or composition was applied in a powdered form in varying quantities from about 50 to about 500 mg or any amount therebetween. For example, the adhesion enhancement material or composition was applied at an amount of 50, 55, 60, 65, 70, 75, 80, 85, 90, 95, 100, 110, 120, 130, 140, 150, 160, 170, 180, 190, 200, 210, 220, 230, 240, 250, 260, 270, 280, 290, 300, 320, 340, 360, 380, 400, 420, 440, 460, 480, 500 mg, or any amount therebetween. The adhesion enhancement material or composition may also be applied as a paste, a film, or as a solid stick, provided that the amount of the adhesion enhancement material or composition that is applied to the surface is at the amounts defined above.

Figure 4A:
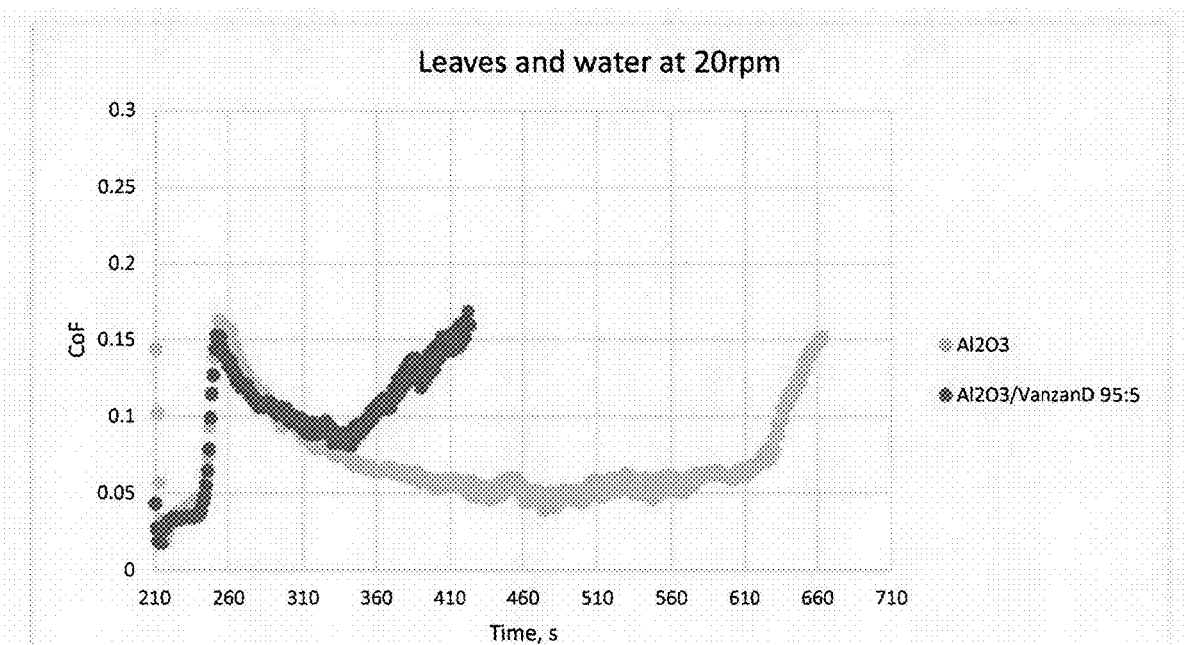
FIG. 4(a) shows a graphical representation of a rate of coefficient of traction (CoT) increase between two surfaces that are in traction, sliding or rolling-sliding contact with each other and contaminated with leaf pieces, upon application of 200 mg of $Al_2O_3$ and a composition comprising $Al_2O_3$ and Vanzan™ D in a ratio of 95:5. The twin disc machine was run under dry conditions at 20 rpm, 1033 MPa contact pressure and 1.5% slip for 20 cycles. Water was added to the contact area of the rotating discs at a rate of 0.6 mL/min for 20 cycles. The contaminant crushed leaves (100 mg) were added with water application for the last 10 cycles. Water application was stopped and 200 mg of adhesion enhancement product was then applied. Only the final steps of the test are shown (210 s) after addition of crushed leaves.

With respect to FIG. 4(a), performance of 200 mg of pure $Al_2O_3$ and a 95:5 mixture of $Al_2O_3$ with Vanzan™ D xanthan gum under leaves/water contamination (0.6 mL/min water application rate with 20 rpm disc speed) is shown. Addition of pure $Al_2O_3$ resulted in an initial increase in the CoT followed by a gradual decrease in the CoT before final traction level restoration about 610 s. Addition of $Al_2O_3$ mixed with Vanzan™ D xanthan gum (95:5 ratio) also resulted in an initial increase in the CoT followed by a gradual decrease in the CoT, but final traction level restoration happened much faster after 350 s.

Figure 4B:
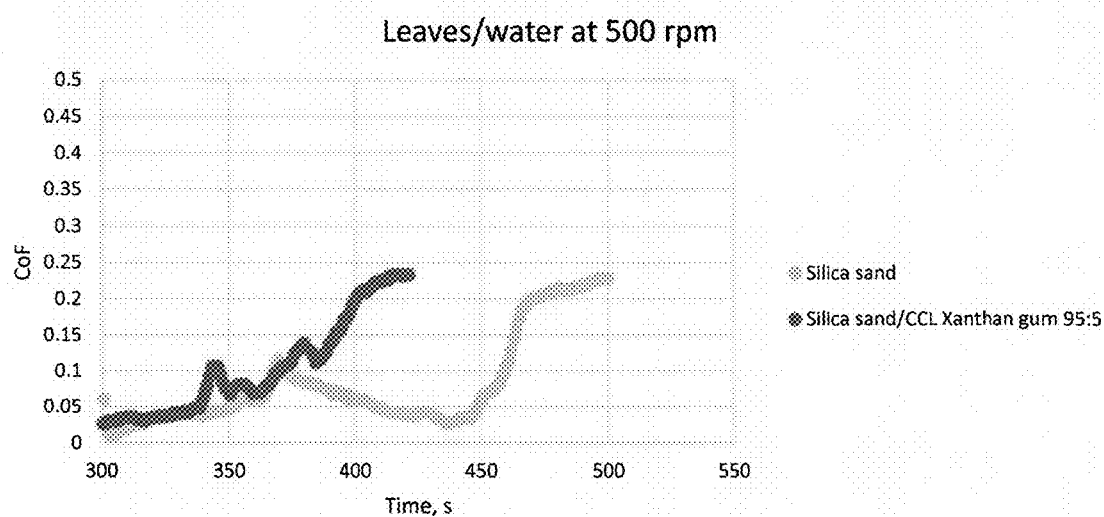
FIG. 4(b) shows a graphical representation of a rate of coefficient of traction (CoT) increase between two surfaces that are in traction, sliding or rolling-sliding contact with each other and contaminated with leaf pieces, upon application of 200 mg of $Al_2O_3$ and a composition comprising $Al_2O_3$ and CCL Xanthan gum in a ratio of 95:5. The twin disc machine was run under dry conditions at 500 rpm, 1033 MPa contact pressure and 1.5% slip for 500 cycles. Water was added to the contact area of the rotating discs at a rate of 0.4 mL/min for 1000 cycles. The contaminant crushed leaves (100 mg) were added with water application for the last 500 cycles. Water application was stopped and 200 mg of product was then applied. Only the final steps of the test are shown (300 s) after addition of crushed leaves.

With respect to FIG. 4(b), performance of 200 mg of pure sand and a 95:5 mixture with CCL xanthan gum under leaves/water contamination (0.4 mL/min water application rate with 500 rpm disc speed) is shown. Addition of pure sand resulted in an initial increase in the CoT followed by a gradual decrease in the CoT before final traction level restoration after 450 s. Addition of sand mixed with CCL xanthan gum also resulted in an initial increase in the CoT followed by a gradual decrease in the CoT, but final traction level restoration happened much faster after approximately 370 s.

Figure 4C:
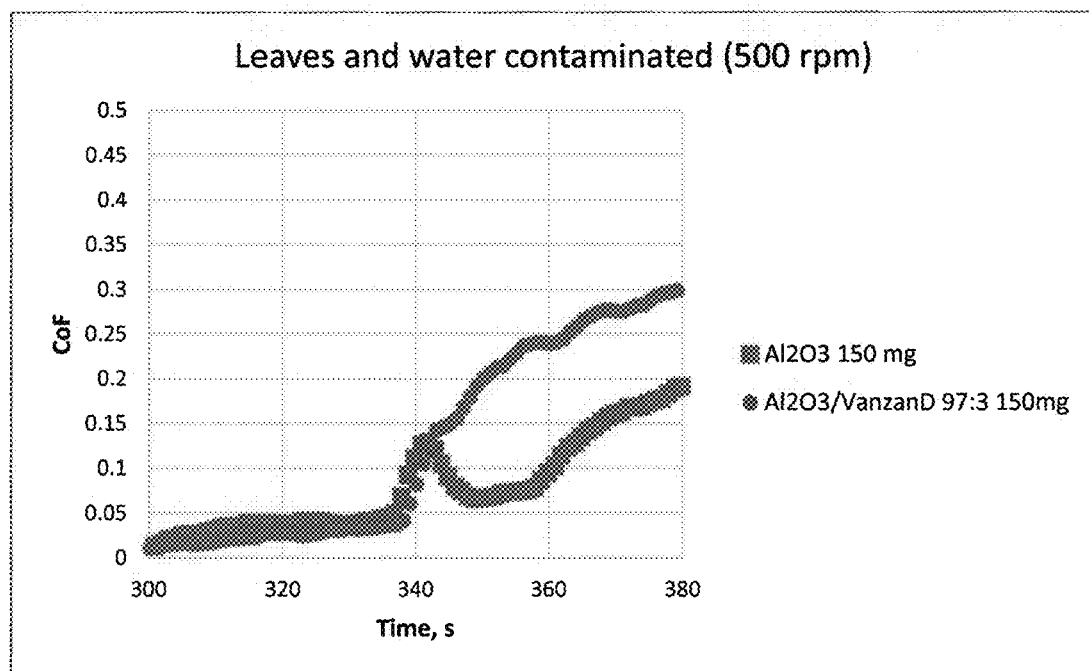
FIG. 4(c) shows a graphical representation of a rate of coefficient of traction (CoT) increase between two surfaces that are in traction, sliding or rolling-sliding contact with each other and contaminated with leaf pieces, upon application of 150 mg of $Al_2O_3$ and a composition comprising $Al_2O_3$ and Vanzan™ D in a ratio of 97:3. The twin disc machine was run under dry conditions at 500 rpm, 1033 MPa contact pressure and 1.5% slip for 500 cycles. Water was added to the contact area of the rotating discs at a rate of 0.4 mL/min for 1000 cycles. The contaminant crushed leaves (100 mg) were added with water application for the last 500 cycles. Water application was stopped and 150 mg of product was then applied. Only the final steps of the test are shown (300 s) after addition of crushed leaves.

With respect to FIG. 4(c), performance of 200 mg of pure $Al_2O_3$ and a 95:5 mixture of $Al_2O_3$ with CCL xanthan gum under leaves/water contamination (0.4 mL/min water application rate with 500 rpm disc speed) is shown. Addition of pure $Al_2O_3$ resulted in an initial increase in the CoT followed by a gradual decrease in the CoT before final traction level restoration at about 380 s. Addition of $Al_2O_3$ mixed with CCL xanthan gum (95:5 ratio) also resulted in an initial increase in the CoT followed by a gradual decrease in the CoT, but final traction level restoration happened much faster after 350 s.

Figure 4D:
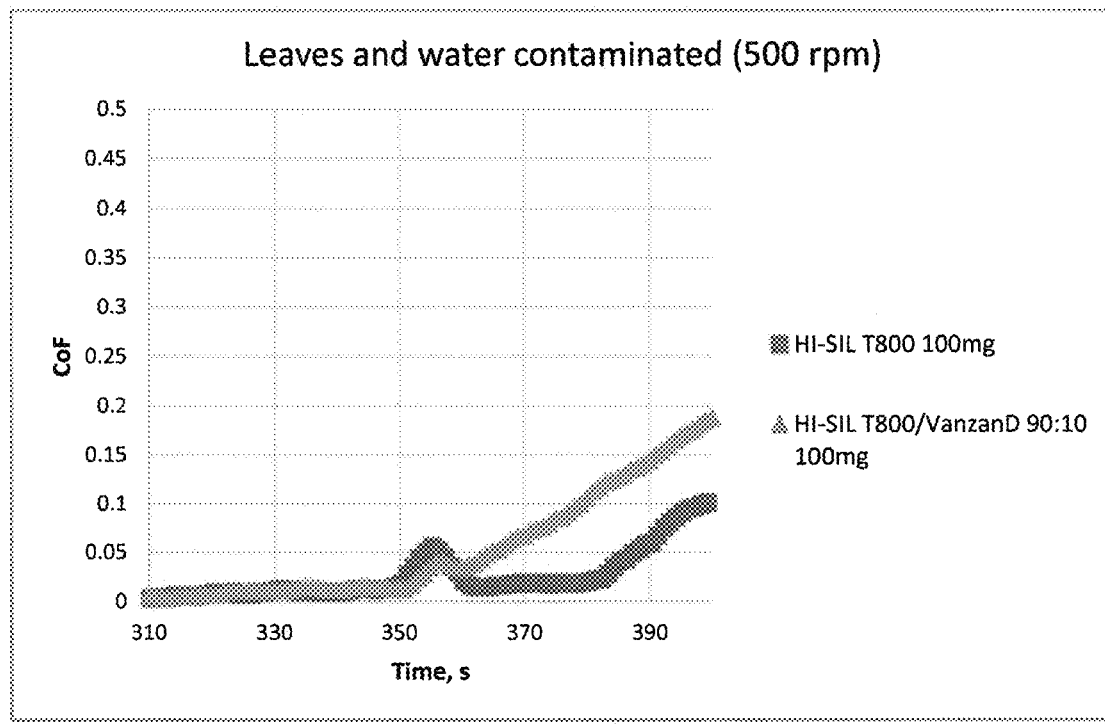
FIG. 4(d) shows a graphical representation of a rate of coefficient of traction (CoT) increase between two surfaces that are in traction, sliding or rolling-sliding contact with each other and contaminated with leaf pieces, upon application of 100 mg of HI-SIL™ T800 and a composition comprising HI-SIL™ T800 and Vanzan™ D in a ratio of 90:10. The twin disc machine was run under dry conditions at 500 rpm, 1033 MPa contact pressure and 1.5% slip for 500 cycles. Water was added to the contact area of the rotating discs at a rate of 0.4 mL/min for 1000 cycles. The contaminant crushed leaves (100 mg) were added with water application for the last 500 cycles. Water application was stopped and 100 mg of product was then applied. Only the final steps of the test are shown (310 s) after addition of crushed leaves.

With respect to FIG. 4(d), performance of 100 mg of HI-SIL™ T800 and a 95:5 mixture of HI-SIL™ T800 with Vanzan™ D xanthan gum under leaves/water contamination (500 rpm disc speed) is shown. Addition of HI-SIL™ T800 resulted in a gradual increase in the CoT. Addition of HI-SIL™ T800 mixed with Vanzan™ D xanthan gum (90:10 ratio) also resulted in a gradual increase in the CoT, but much faster.

Figure 4E:
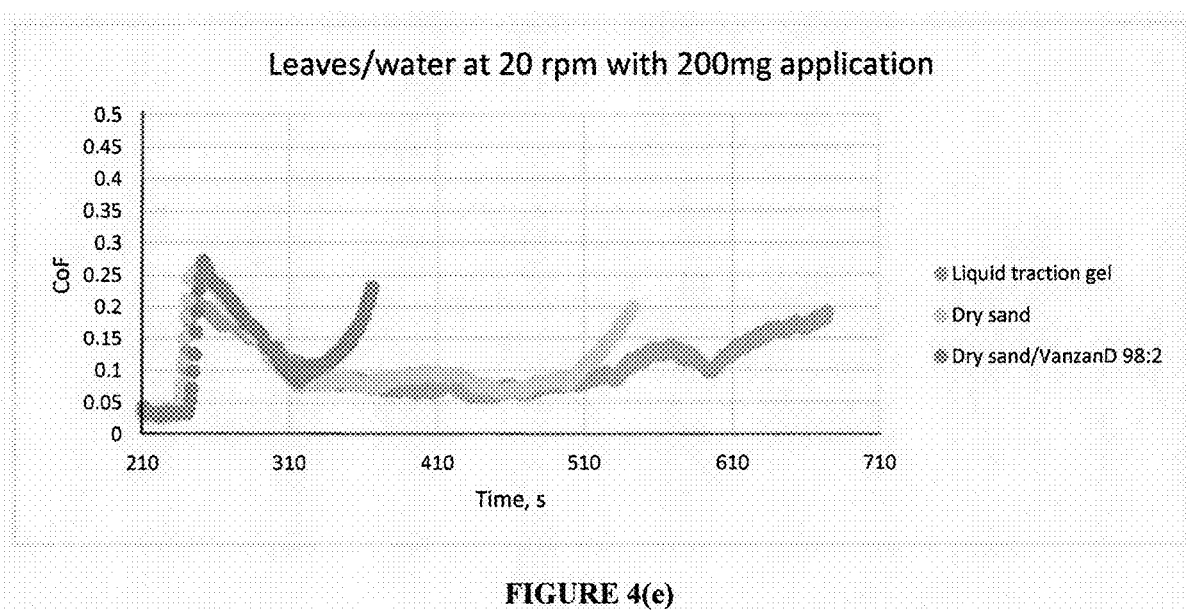
FIG. 4(e) shows a graphical representation of a rate of coefficient of traction (CoT) increase between two surfaces that are in traction, sliding or rolling-sliding contact with each other and contaminated with leaf pieces, upon application of 200 mg of dry sand, liquid traction gel and a composition comprising dry sand and Vanzan™ D in a ratio of 98:2. The twin disc machine was run under dry conditions at 20 rpm, 1033 MPa contact pressure and 1.5% slip for 20 cycles. Water was added to the contact area of the rotating discs at a rate of 0.4 mL/min for 20 cycles. The contaminant crushed leaves (100 mg) were added with water application for the last 10 cycles. Water application was stopped and 200 mg of adhesion enhancement product was then applied. Only the final steps of the test are shown (210 s) after addition of crushed leaves.

The performance of a mixture of dry sand and Vanzan™ D in a ratio of 98:2 was compared dry sand and a commercial traction gel. As shown in FIG. 4(e), addition of all materials under leaves/water contamination resulted in an initial increase in the CoT followed by a gradual decrease in the CoT before final traction level restoration. However, the final traction level restoration happed significantly faster for the dry mixture of sand with Vanzan™ D.

Low Adhesion—Soap Contamination

Figure 5A:
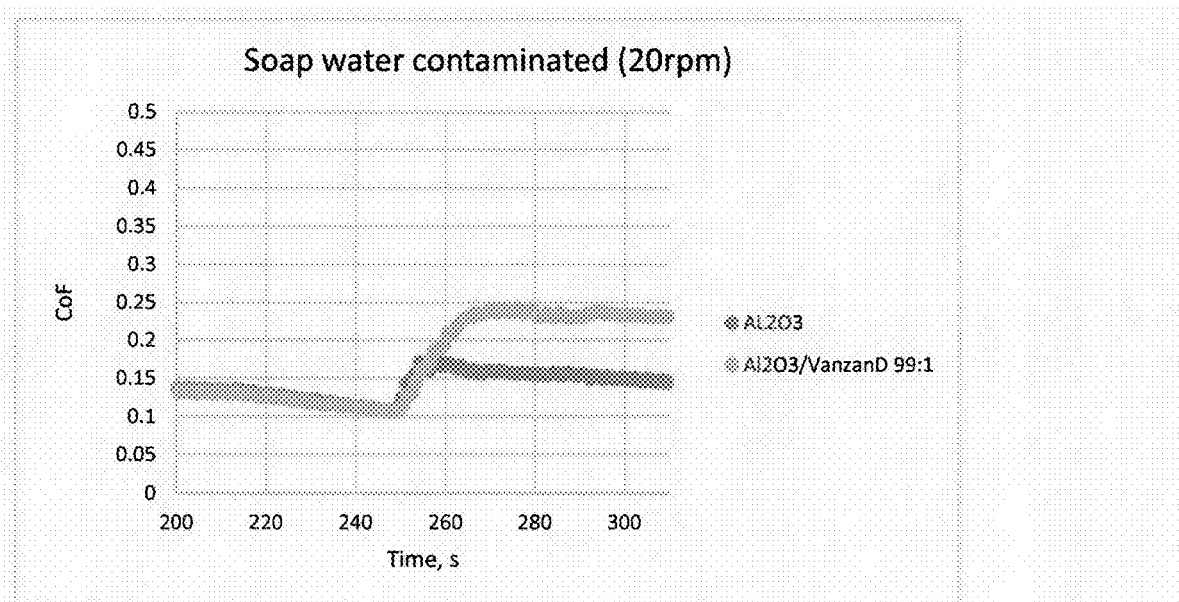
FIG. 5(a) shows a graphical representation of a rate of coefficient of traction (CoT) increase between two surfaces that are in traction, sliding or rolling-sliding contact with each other and contaminated with soap water, upon application of 100 mg of $Al_2O_3$ and a composition comprising $Al_2O_3$ and Vanzan™ D in a ratio of 99:1 at the end of 20 cycles of water application. The twin disc machine was run under dry conditions at 20 rpm, 1033 MPa contact pressure and 15% slip for 20 cycles. Soap water was added to the contact area of the rotating discs at a rate of 0.2 mL/min for 20 cycles. Soap water application was stopped and 100 mg of product was then applied. Only the final steps of the test are shown (200 s).
Figure 5B:
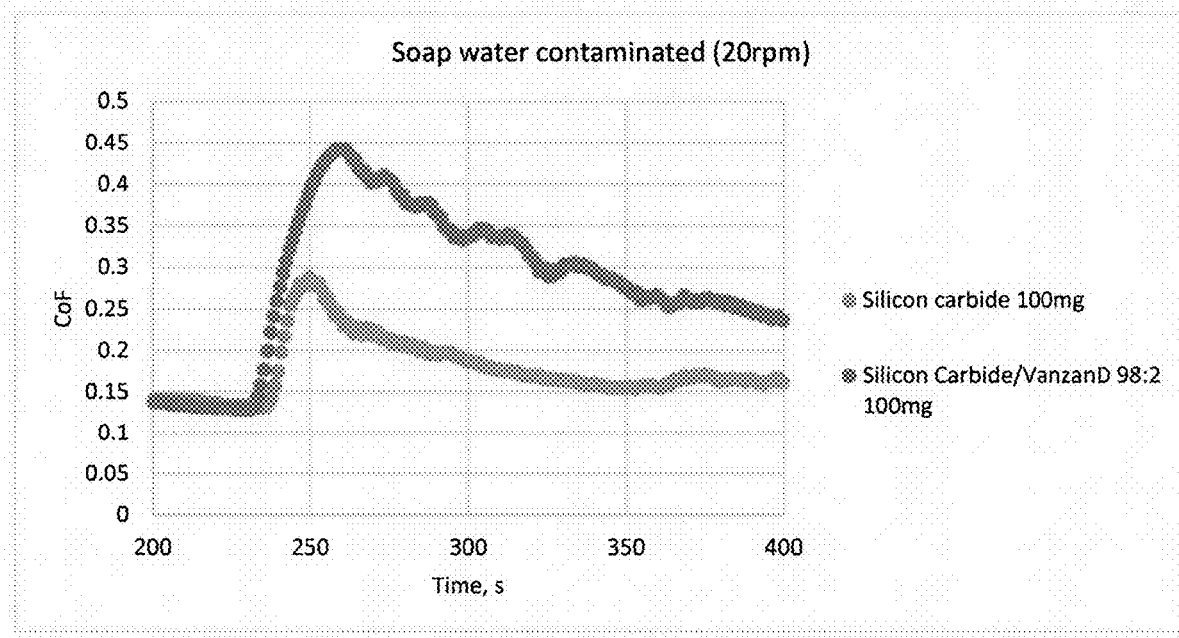
FIG. 5(b) shows a graphical representation of a rate of coefficient of traction (CoT) increase between two surfaces that are in traction, sliding or rolling-sliding contact with each other and contaminated with soap water, upon application of 100 mg of silicon carbide and a composition comprising silicon carbide and Vanzan™ D in a ratio of 98:2. The twin disc machine was run under dry conditions at 20 rpm, 1033 MPa contact pressure and 15% slip for 20 cycles. Soap water was added to the contact area of the rotating discs at a rate of 0.2 mL/min for 20 cycles. Soap water application was stopped and 100 mg of adhesion enhancement material was then applied. Only the final steps of the test are shown (200 s).
Figure 5C:
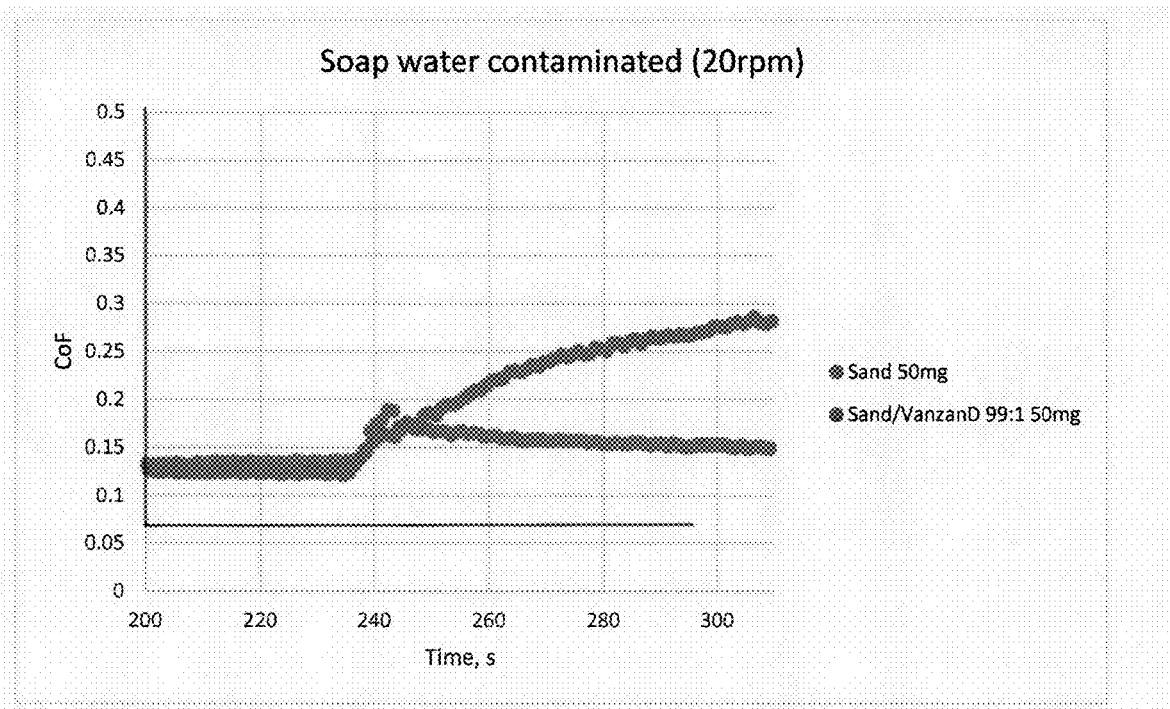
FIG. 5(c) shows a graphical representation of a rate of coefficient of traction (CoT) increase between two surfaces that are in traction, sliding or rolling-sliding contact with each other and contaminated with soap water, upon application of 50 mg of sand and a composition comprising sand and Vanzan™ D in a ratio of 99:1. The twin disc machine was run under dry conditions at 20 rpm, 1033 MPa contact pressure and 15% slip for 20 cycles. Soap water was added to the contact area of the rotating discs at a rate of 0.2 mL/min for 20 cycles. Soap water application was stopped and 50 mg of adhesion enhancement material was then applied. Only the final steps of the test are shown (200 s).

The performance of dry $Al_2O_3$, silicon carbide, and sand were compared to the dry mixtures of these materials with Vanzan™ D. As shown in FIG. 5(a), the dry mixture of $Al_2O_3$ with Vanzan™ D in a ratio of 99:1 provided significantly higher CoT in comparison with dry $Al_2O_3$ alone. As shown in FIG. 5(b), the dry mixture of silicon carbide with Vanzan™ D in a ratio of 98:2 provided significantly higher CoT in comparison with dry silicon carbide alone. As shown in FIG. 5(c), the dry mixture of sand with Vanzan™ D in a ratio of 99:1 provided significantly higher CoT in comparison with dry sand alone.

Figure 5D:
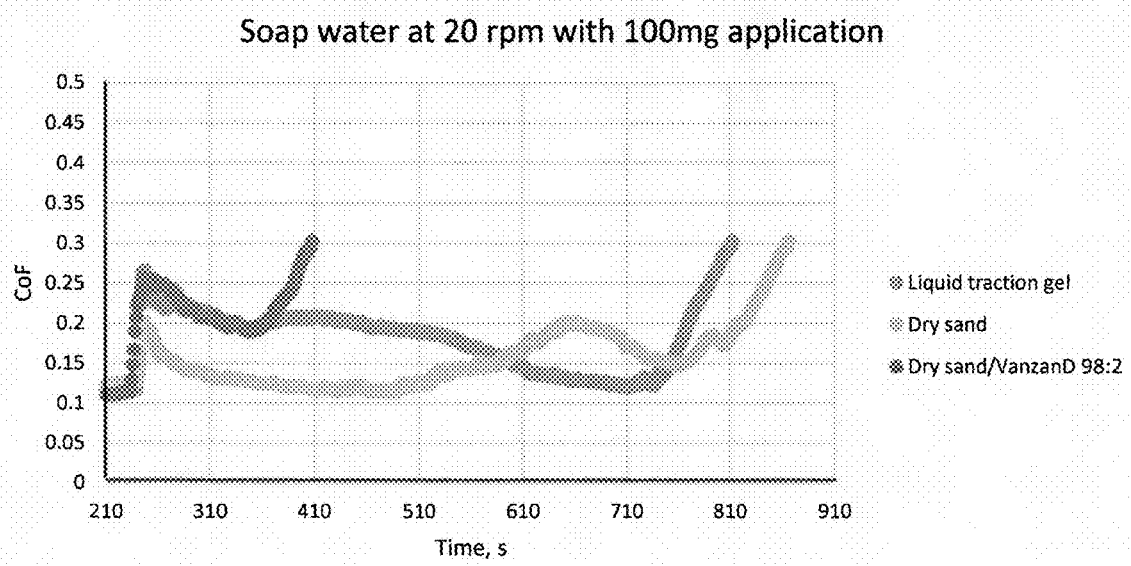
FIG. 5(d) shows a graphical representation of a rate of coefficient of traction (CoT) increase between two surfaces that are in traction, sliding or rolling-sliding contact with each other and contaminated with soap water, upon application of 100 mg of liquid traction gel, dry sand and a composition comprising sand and Vanzan™ D in a ratio of 98:2. The twin disc machine was run under dry conditions at 20 rpm, 1033 MPa contact pressure and 15% slip for 20 cycles. Soap water was added to the contact area of the rotating discs at a rate of 0.4 mL/min for 20 cycles. Soap water application was stopped and 100 mg of adhesion enhancement material was then applied. Only the final steps of the test are shown (200 s).

The performance of a mixture of dry sand and Vanzan™ D in a ratio of 98:2 was compared dry sand and a commercial traction gel. As shown in FIG. 5(d), addition of all materials under soap water contamination resulted in an initial increase in the CoT followed by a gradual decrease in the CoT before final traction level restoration. However, the final traction level restoration happed significantly faster for the dry mixture of sand with Vanzan™ D.

Low Adhesion—Oil Contamination

Figure 7A:
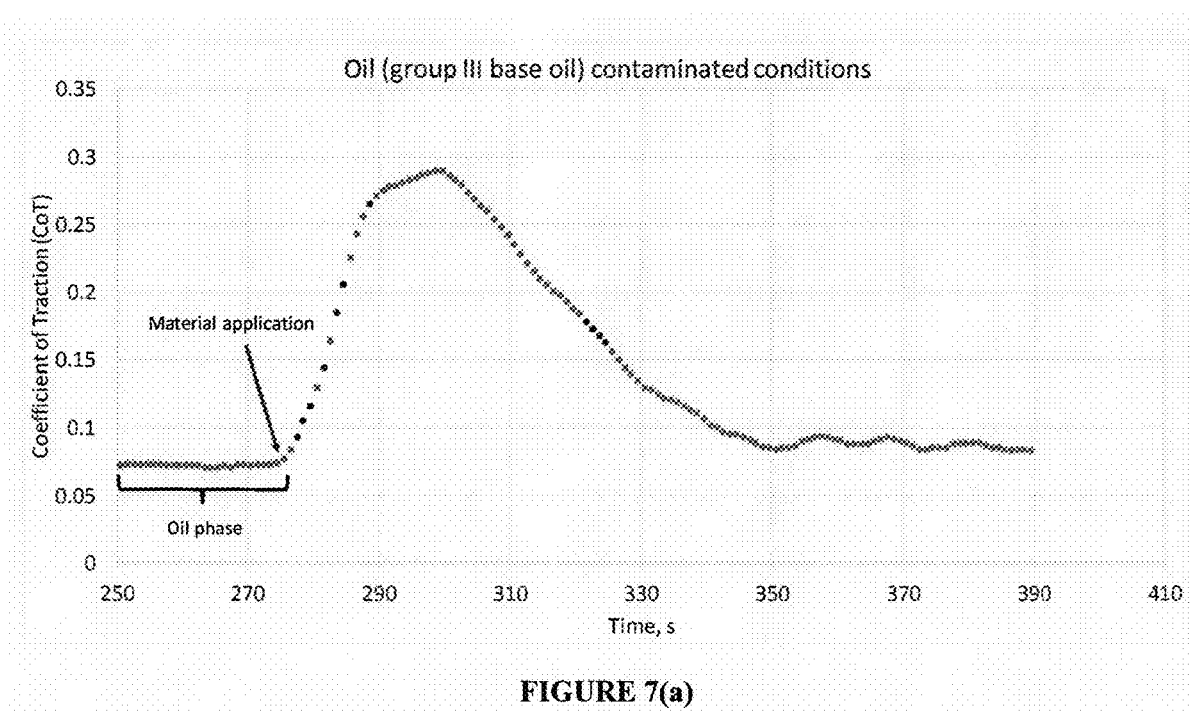
FIG. 7(a) shows a graphical representation of a time course of a typical twin-disk analysis where the contaminant is oil. The change in the coefficient of traction (CoT), after material addition, was used to determine the efficacy of the applied material or composition as an adhesion enhancer, under the contaminated condition. "Oil phase"—30 mg (3 drops) of a petroleum based oil (Group III base oil) was applied to one of the rotating discs at 20 rpm and 0.1 kN load, for 40 cycles, after which the discs were stopped. "Material application"—the disks were run at 500 rpm, 3.6 kN load (1033 MPa) and 1.5% creep, the material or composition was applied to the contact area of the rotating discs, and the discs were run for 1000 cycles.

With reference to FIG. 7(a), which shows a standard time course of a typical twin disc analysis with oil as the contaminant. For oil contamination simulations, 30 mg of petroleum based oil (Group III base oil) was applied to three different spots in the 10 mm wide contact band area of one of the rotating discs. The discs rotated at 20 rpm under a 0.1 kN load. The discs were left rotating for 40 cycles (approx. 2 min) after oil application. The discs were then brought to a complete stop and the initial load was removed. Standard test conditions involved disk rotation at 500 rpm, 3.6 kN load (1033 MPa) and 1.5% creep. The adhesion enhancement material or composition was then applied in varying quantities, from about 50 to about 200 mg, directly into the contact area of the rotating discs and the discs were run for 1000 cycles. The increase in traction coefficient between the discs and the track following adhesion enhancement application was determined over a period of 10 secs, and the change in the rate of traction coefficient, either an increase or decrease, attributable to the application of the adhesion enhancement composition was calculated.

The adhesion enhancement material or composition was applied in a powdered form in varying quantities from about 50 to about 200 mg or any amount therebetween. For example, the adhesion enhancement material or composition was applied at an amount of 50, 55, 60, 65, 70, 75, 80, 85, 90, 95, 100, 110, 120, 130, 140, 150, 160, 170, 180, 190, 200 mg, or any amount therebetween. However, higher amount of the adhesion material or composition may be applied in order to absorb as much of the liquid in the interface between the wheel and track. The adhesion enhancement material or composition may also be applied as a paste, a film, or as a solid stick, provided that the amount of the adhesion enhancement material or composition that is applied to the surface is at the amounts defined above.

Adhesion Enhancement Agent

Figure 6A:
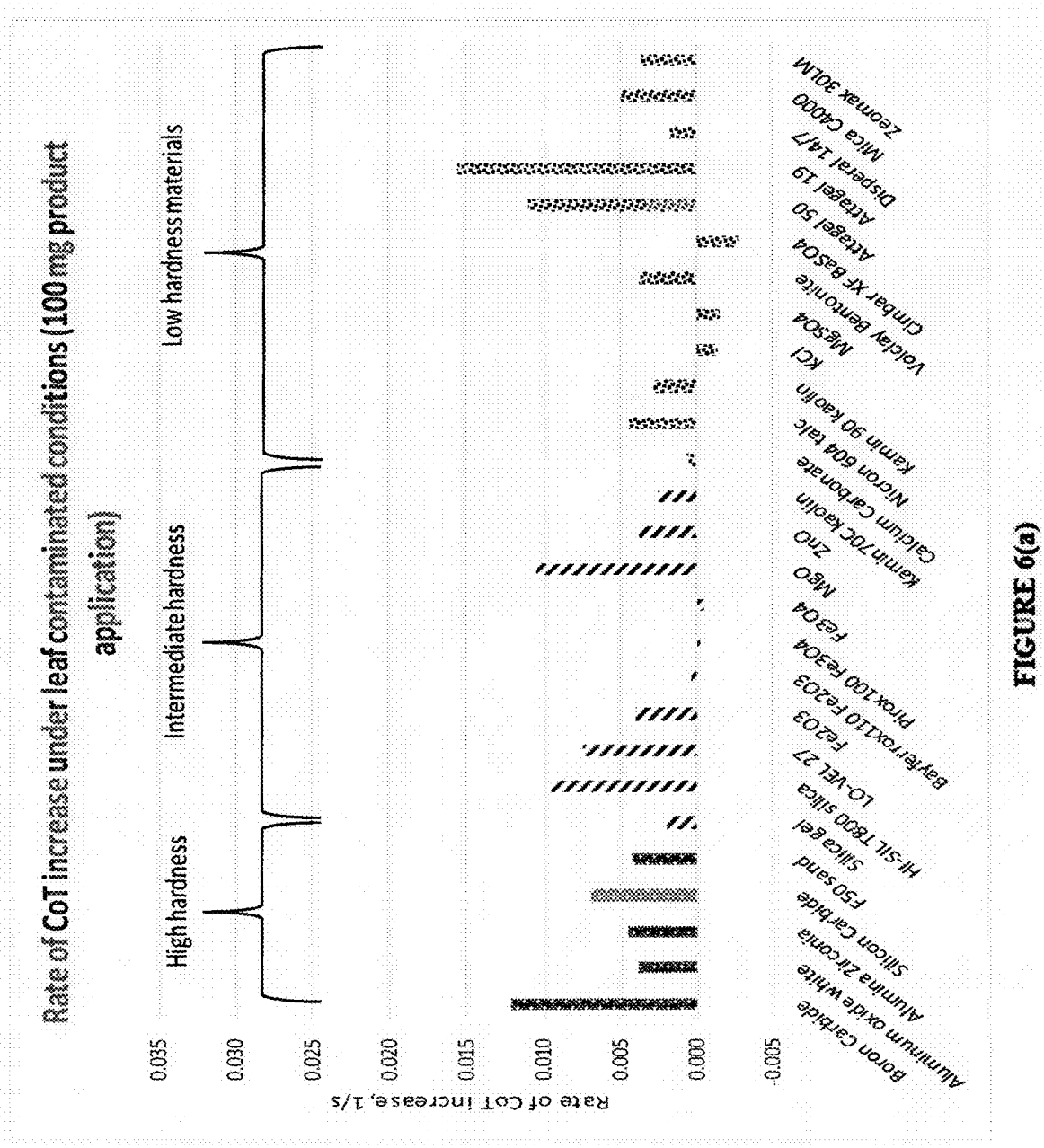
FIG. 6(a) shows a graphical representation of a rate of coefficient of traction (CoT) increase between two surfaces that are in traction, sliding or rolling-sliding contact with each other and contaminated with leaf pieces, upon application of different adhesion enhancement materials (at an amount of 100 mg) of different Mohs hardness values (see Tables 1 and 2 for Mohs hardness and equivalent Vickers hardness values) to the contacting surfaces. High hardness: Mohs hardness great than or equal to 7; Intermediate hardness: Mohs harness of 4-7; Low hardness: Mohs hardness of less than or equal to 4.
Figure 6B:
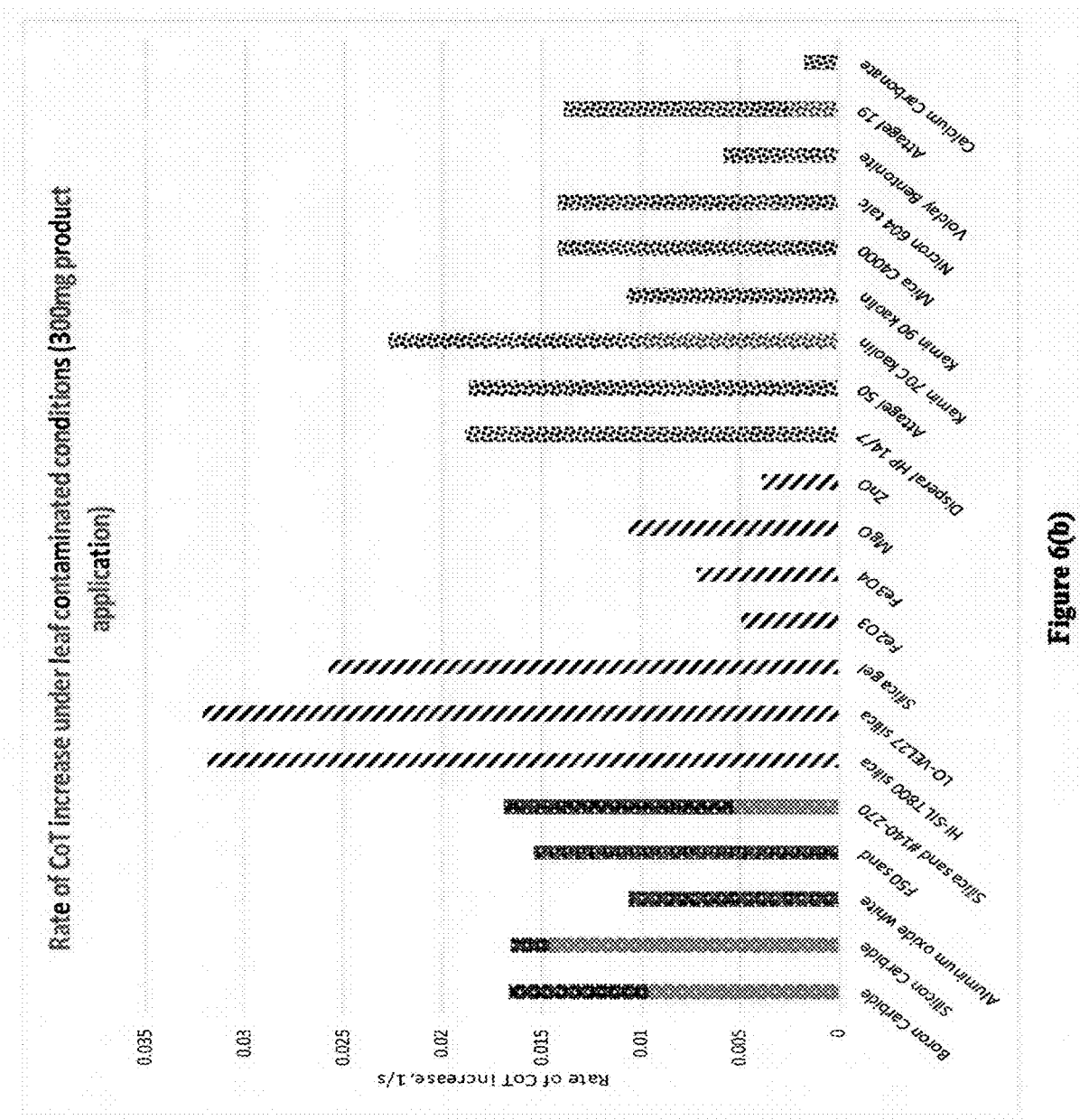
FIG. 6(b) shows a graphical representation of a rate of coefficient of traction (CoT) increase between two surfaces that are in traction, sliding or rolling-sliding contact with each other and contaminated with leaf pieces, upon application of different adhesion enhancement materials (at an amount of 300 mg) of different Mohs hardness values (see Tables 1 and 2 for Mohs hardness and equivalent Vickers hardness values) to the contacting surfaces.
Figure 7B:
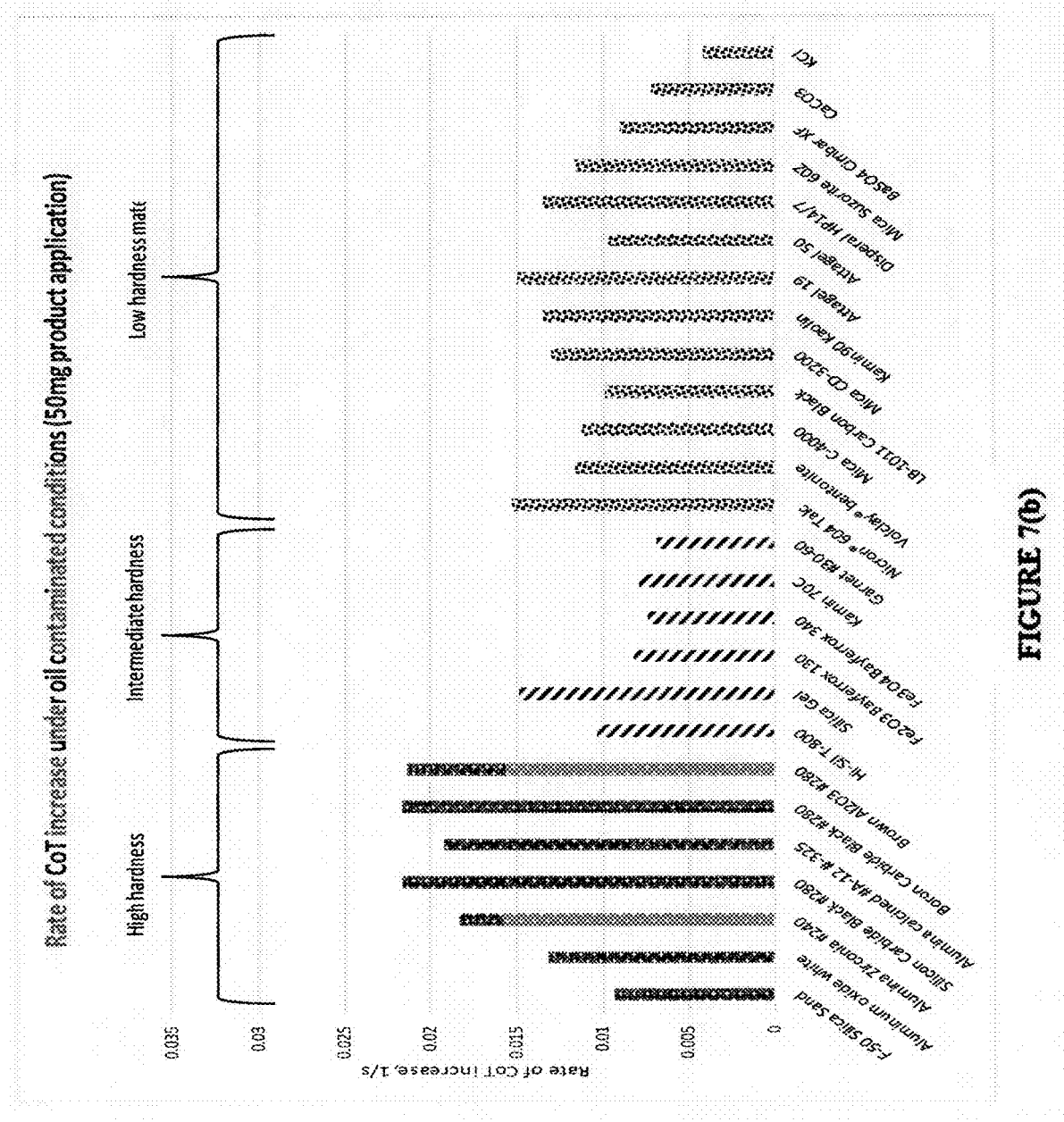
FIG. 7(b) shows a graphical representation of a rate of coefficient of traction (CoT) increase between two surfaces that are in sliding or rolling-sliding contact with each other and contaminated with oil-based contaminants, upon application of different adhesion enhancement compositions comprising materials of different Mohs hardness values (see Tables 1 and 2 for Mohs hardness and equivalent Vickers hardness values) to the contacting surfaces at an amount of 50 mg. High hardness: Mohs hardness great than or equal to 7; Intermediate hardness: Mohs harness of 4-7; Low hardness: Mohs hardness of less than or equal to 4.
Figure 7C:
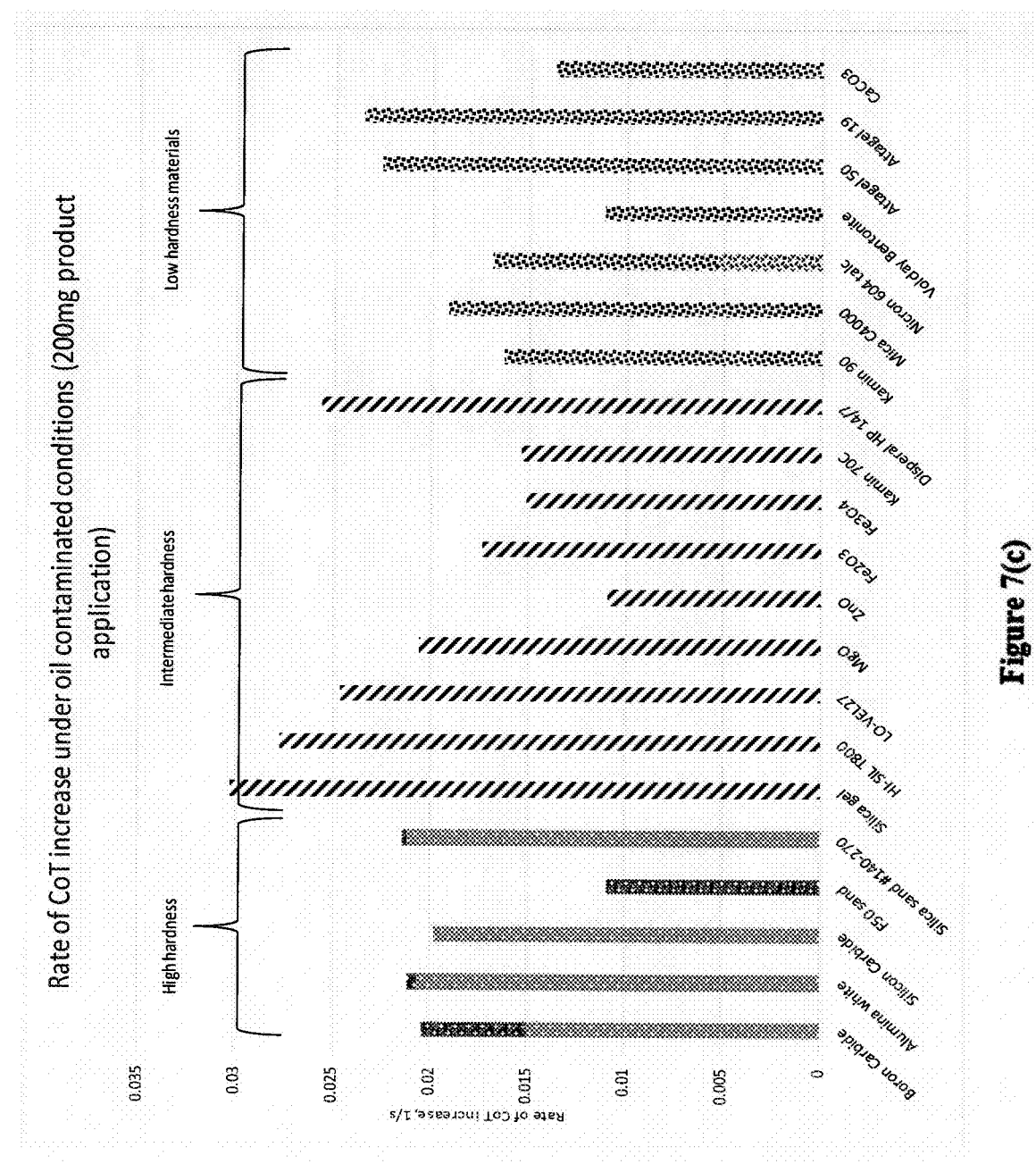
FIG. 7(c) shows a graphical representation of a rate of coefficient of traction (CoT) increase between two surfaces that are in sliding or rolling-sliding contact with each other and contaminated with oil-based contaminants, upon application of different adhesion enhancement compositions comprising materials of different Mohs hardness values (see Tables 1 and 2 for Mohs hardness values) to the contacting surfaces at an amount of 200 mg. High hardness: Mohs hardness great than or equal to 7; Intermediate hardness: Mohs harness of 4-7; Low hardness: Mohs hardness of less than or equal to 4.

Referring to FIGS. 6(a), 6(b), 7(b) and 7(c), a variety of candidate adhesion enhancement materials were tested under conditions where the contaminant was leaf debris (FIGS. 6(a) and 6(b)), or the contaminant was oil (FIGS. 7(b) and 7(c)).

As shown in FIGS. 6(a) and 7(b), all of the materials having a Mohs hardness value greater than 7 exhibited an increase in the rate of the traction coefficient and may be used as an adhesion enhancement composition (applied at an amount of 100 mg). Materials having a Mohs hardness value of greater than or equal to 7 (or a Vickers hardness of greater than or equal to 1000), include, but are not limited to, carbide based compounds, amphoteric oxide based compounds, and any combination thereof. For example, which is not to be considered limiting in any manner, these compounds may include carbide based compounds, amphoteric oxide based compounds, zirconium oxide based compounds, and any combination thereof. Carbides include, but are not limited to, boron carbide and silicon carbide. Amphoteric oxides include, but are not limited to, aluminum oxides materials (e.g. $Al_2O_3$), silica-based compounds (e.g. $SiO_2$ sand), zirconium oxide based compounds, and combinations thereof.

Similar results were observed when an increased amount of material was applied to the twin-disks, however, the increase in adhesion enhancement was more evident (see FIGS. 6(*b*), 7(*c*) and 8).

Several adhesion enhancement materials shown in FIGS. 6(*a*), 6(*b*), 7(*b*) and 7(*c*) have a Mohs hardness great than 7 (a Vickers hardness of greater than 1000), performed better than sand (F50 sand) and these materials are well suited for use as an adhesion enhancement material in leaf-debris, or oil, contaminated conditions. These materials include boron carbide, silicon carbide, alumina white, alumina zirconia, alumina calcined #A-12 #325, boron carbide black, brown alumina oxide #280, silica sand #140-270, silica sand #70-100, silica sand #35-50, or combinations thereof.

However, as all of the materials having a Mohs hardness value of greater than 7 (see FIGS. 6(*a*) and 7(*b*)) were effective in increasing the rate of increase of the coefficient of traction under the test conditions, any of these materials may be used on their own, or mixed with one or more organic rheology additives or one or more second components as described herein and used as an adhesion enhancement composition, provided that the mixture (the adhesion enhancement composition) exhibits an increase in the rate of change of the traction coefficient when tested using a twin-disk machine and under conditions defined herein.

Referring to FIGS. 2, 3(*a*), 3(*b*), 4(*a*), 4(*b*), 4(*c*), 4(*d*), 4(*e*), 5(*a*), 5(*b*), 5(*c*) and 5(*d*), the adhesion enhancement composition may comprise one or more than one first component and one or more than one organic rheology additive, as these materials perform better than the first component on its own. These dry materials are therefore well suited for use as an adhesion enhancement material in a variety of contamination conditions. Organic rheology additives include, and that may be used as an adhesion enhancing agent, or in an adhesion enhancement composition, a xanthan gum (for example, Vanzan™ (for example, Vanzan™ D) or CCL xanthan gum), an organic polymer absorbent (for example, an acrylic, a superabsorbent polymer), a cellulosic material (for example, carboxymethyl cellulose (CMC), carboxy-hydroxymethyl cellulose (CHMC; METHOCEL™) and ethoxymethyl cellulose (EMC)), a polysaccharide (for example, chitosan or a starch) or any combination thereof. The one or more than one organic rheology additive may be Vanzan™ D, Mecellose PMC40H or CMC P1-8000. The organic rheology additives show a faster increase in the rate of change of the traction coefficient when tested using a twin disc machine and under conditions defined herein as compared to the non-organic rheology additives, a commercial liquid traction gel and the one or more first component on its own. Without being bound by theory, it is believed that a composition comprising one or more first components with a Mohs hardness value of equal to or greater than 7 (Vickers hardness equal to or greater than 1000) and one or more than one organic rheology additive, wherein the one or more than one first component and the one or more than one organic rheology additive are present in a ratio from about 90:1 to about 99.9:01 (wt/wt), and wherein the composition does not comprise water, can perform as an adhesion enhancement composition for a range of contaminant types, and over a wide range of application rates.

The one or more than one organic rheology additive may be mixed with one or more than one first component to form a mixture comprising one or more than one first component mixed with one or more than one organic rheology additive for use as an adhesion enhancement agent, provided that the adhesion enhancement composition exhibits an increase in the rate of change of the traction coefficient when tested using a twin disc machine and under conditions defined herein. The one or more first component and the organic rheology additive may be present in any suitable ratio, for example, in a ratio of about 90:10, about 91:9, about 92:8, about 93:7, about 96:4, about 95:5, about 96:4, about 97:3, about 98:2, about 99:1, about 99.9:0.1 (wt/wt), or any amount therebetween, provided that the mixture (the adhesion enhancement composition) exhibits an increase in the rate of change of the traction coefficient when tested using a twin disc machine and under conditions defined herein. The adhesion enhancement composition may not contain water.

Several of the organic rheology additives were also effective in increasing the rate of increase of the coefficient of traction under the test conditions and exhibited an increase in the traction coefficient that was greater than F50 sand. These additives may be used on their own, or mixed with one or more first component as described herein and used as an adhesion enhancement composition, provided that the mixture (the adhesion enhancement composition) exhibits an increase in the rate of change of the traction coefficient when tested using a twin disc machine and under conditions defined herein.

Referring to FIGS. 6(*a*), 6(*b*), 7(*b*) and 7(*c*), the adhesion enhancement composition may also comprise one or more than one second component having a Mohs hardness value of between about 4 and about 7 (or a Vickers hardness of between about 300 to about 1000), or the one or more than one second component may include materials having a Mohs hardness value between about 1 to about 7 (a Vickers hardness of between about 10 to about 1000), as these materials performed better than sand (F50 sand). These materials are therefore well suited for use as an adhesion enhancement material in leaf-debris, or oil, contaminated conditions. Materials having a Mohs hardness value of between 4 and 7 include and that may be used as an adhesion enhancing agent, or in an adhesion enhancement composition, include a silica-based compound, a ferric oxide based compound, an amphoteric oxide based compound, an alkaline earth metal oxide based compound, a phyllosilicate based compound, an aluminosilicate compound, a porous or molecular sieve material, and a combination thereof. For example, the amphoteric oxide based compound may be selected from the group of aluminum, zirconium, iron, zinc, magnesium, silicon oxide, the silica based compound may be selected from the group of crystalline silica, sand, amorphous silica, silica gel, synthetic precipitated silica, diatomaceous earth, the phyllosilicate based compound may be selected from the group of clay, mica, talc, the aluminosilicate compound may be selected from the group of minerals, zeolites, the porous or molecular sieve material may be selected from the group of silica gel, zeolites. Additional materials that may be used as a second component include but are not limited to, silica-based materials (e.g. silica gel, HI-SIL™ T800 silica, LO-VEL™ 27), ferric oxide based compounds (e.g. iron oxides, $Fe_2O_3$, $Fe_3O_4$, ferric oxide, hematite, Bayferrox® 130), alkaline earth metal oxide based compounds (e.g. MgO), amphoteric based oxides, for example, zinc oxide based compounds, MgO, ZnO, iron oxide, phyllosilicate based compounds (e.g. Kamin 70 kaolin), an alumina based product for example boehmite, alumina monohydrates, AlOOH, bayerite, $Al(OH)_3$ (Disperal® products), or an organic polymer absorbent, for example an acrylic, a superabsorbent polymer, or a cellulosic material for example carboxymethyl cellulose (CMC), carboxy-hydroxymethyl cellulose (CHMC; METHOCEL™), ethoxymethyl cellulose (EMC), and combinations thereof. In a non-limiting example, the one or more compounds having a Mohs hardness value of between 4 and 7 are selected from the group consisting of silica-based compounds (e.g. silica gels, HI-SIL™ T800 silica, LO-VEL™ 27), ferric oxide based compounds (e.g. hematite, Bayferrox® 130), alkaline earth metal oxide based compounds (e.g. MgO), amphoteric based oxides (e.g. zinc oxide based compounds, MgO, ZnO, iron oxide), phyllosilicate based compounds (e.g. Kamin 70 kaolin), and combination thereof. Furthermore, the one or more than one second component may be defined as having a Mohs hardness value between 1 and 7, and in addition to the materials just identified, they may also include Dispersal® HP14/7, Nicron® 353 talc, Nicron® 604 talc, Volclay® bentonite, Mica C4000, LB-1011 Carbon Black, Mica CD-3200, Kamin 90 kaolin, Attagel® 19, Attagel® 50, Disperal® HP14/7, Mica Suzorite® 60Z, $BaSO_4$ Cimbar XF, calcium carbonate, Garnet #30-60, mica CD-3200, LB-1011 carbon black, Attagel® (an attapulgite or palygorskite; magnesium aluminum phyllosilicate; $(Mg,Al)_2Si_4O_{10}(OH)_4(H_2O)$), magnesium sulfate, Zeomax 30LM (zeolite), vermiculite, swellable clay, or any combination thereof.

The one or more than one second component defined as having a Mohs hardness value between 1 and 4, for example, carbonate-based compounds (e.g. $CaCO_3$), magnesium silicate based compounds (e.g. talc, Nicron® 604 talc, Attagel® 50, Attagel® 19), bentonite based compounds, boehmite based compounds (e.g. Disperal® 14/7), phyllosilicate based compounds (e.g. Kamin 90 kaolin), muscovite based compounds (Imerys™ C4000™) and zeolite based compounds (e.g. Zeomax™ 30LM) may be mixed with one or more than one first component to form a mixture comprising one or more than one first component mixed with one or more than one second component for use as an adhesion enhancement agent, provided that the adhesion enhancement composition exhibits an increase in the rate of change of the traction coefficient when tested using a twin-disk machine and under conditions defined herein.

Several of the materials shown in FIGS. 6(a), 6(b), 7(b) and 7(c) that have a Mohs hardness value below 7 (Vickers hardness below 1000) were also effective in increasing the rate of increase of the coefficient of traction under the test conditions and exhibited an increase in the traction coefficient that was greater than F50 sand. These materials (for example, HI-SIL™ T800 silica, silica gel, LO-VEL27™, iron oxide, magnesium oxide, zinc oxide, Nicron® 604 talc, Volclay® bentonite, Attagel® 50, Attagel® 19, mica C4000, LB-1011 carbon black, mica CD-3200, Kamin90 kaolin, Disperal® HP 14/7, mica Suzorite® 60Z, $BaSO_4$ Cimbar XF) may be used on their own, or mixed with one or more first or second components as described herein and used as an adhesion enhancement composition, provided that the mixture (the adhesion enhancement composition) exhibits an increase in the rate of change of the traction coefficient when tested using a twin-disk machine and under conditions defined herein. Preferably, if one material is used on its own as an adhesion enhancement agent, then the material also exhibits the property of being able to absorb liquid (as defined above).

In a non-limiting example, an adhesion enhancement composition may comprise one or more first component having a Mohs hardness value of greater than or equal to 7. For example, the first component may be boron carbide. Furthermore, the one or more than one first component may be mixed with another first component (having a Mohs hardness greater than 7), or with a second component having a Mohs hardness between about 1 and about 7, or about 4 and about 7, and that exhibits the characteristic of absorbing a liquid, for example but not limited to, water, water mixtures, contaminated water, oil, grease, or a combination thereof. The two or more first components, or the first and second components, may be present in any suitable ratio, for example in a ratio of about 1:1000, about 1:100, about 1:75, about 1:50, about 1:25, about 1:15, about 1:10, about 1:9, about 1:8, about 1:7, about 1:6, about 1:5, about 1:4, about 1:3, about 1:2, about 1:0.1. For example, the two or more first components or the first and second components may be present at a ratio of between about 1:1000, 1:950, 1:900, 1:850, 1:800, 1:750, 1:700, 1:650, 1:600, 1:550, 1:500, 1:450, 1:400, 1: 350, 1:300, 1:250, 1:200, 1:150, 1:100, 1:75, 1:50, 1:25, 1:20, 1:15, 1:14, 1:13, 1:12, 1:11, 1:10, 1:9, 1:8, 1:7, 1:6, 1:5, 1:4, 1:3, 1:2, 1:1, 1:0.9, 1:0.8, 1:0.7, 1:0.6, 1:0.5, 1:0.4, 1:0.3, 1:0.2, 1:0.1 (wt/wt), or any amount therebetween, provided that the mixture (the adhesion enhancement composition) exhibits an increase in the rate of change of the traction coefficient when tested using a twin-disk machine and under conditions defined herein.

Additionally, the adhesion enhancement composition may comprise two or more second components having a Mohs hardness value of between about 1 and about 7 (or a Vickers hardness of between about 10 to about 1000), the two or more components may be present in any suitable ratio. For example, in an adhesion enhancement composition comprising two components having a Mohs hardness value of between about 4 and about 7 (or a Vickers hardness of between about 300 to about 1000), the two components can be present in a ratio of about 1:1000, about 1:100, about 1:75, about 1:50, about 1:25, about 1:15, about 1:10, about 1:9, about 1:8, about 1:7, about 1:6, about 1:5, about 1:4, about 1:3, about 1:2, about 1:1. For example, the two or more first components or the first and second components may be present at a ratio of between about 1:1000, 1:950, 1:900, 1:850, 1:800, 1:750, 1:700, 1:650, 1:600, 1:550, 1:500, 1:450, 1:400, 1: 350, 1:300, 1:250, 1:200, 1:150, 1:100, 1:75, 1:50, 1:25, 1:20, 1:15, 1:14, 1:13, 1:12, 1:11, 1:10, 1:9, 1:8, 1:7, 1:6, 1:5, 1:4, 1:3, 1:2, 1:1, 1:0.9, 1:0.8, 1:0.7, 1:0.6, 1:0.5, 1:0.4, 1:0.3, 1:0.2, 1:0.1 (wt/wt), or any amount therebetween, or for example, about 1:10, about 5:95, about 10:90, or about 15:85 (wt/wt), provided that the mixture (the adhesion enhancement composition) exhibits an increase in the rate of change of the traction coefficient when tested using a twin-disk machine and under conditions defined herein.

Compositions comprising one or more than one second component exhibit an ability to absorb liquid (as defined herein), for example, water, contaminated water, oil, or a combination thereof, and the second component may be referred to as "absorbent materials". The second component therefore exhibits a measurable Mohs hardness value of from about 1 to about 7 (Vickers hardness from about 10 to about 1000); and a measurable ability to absorb liquid.

Figure 6C:
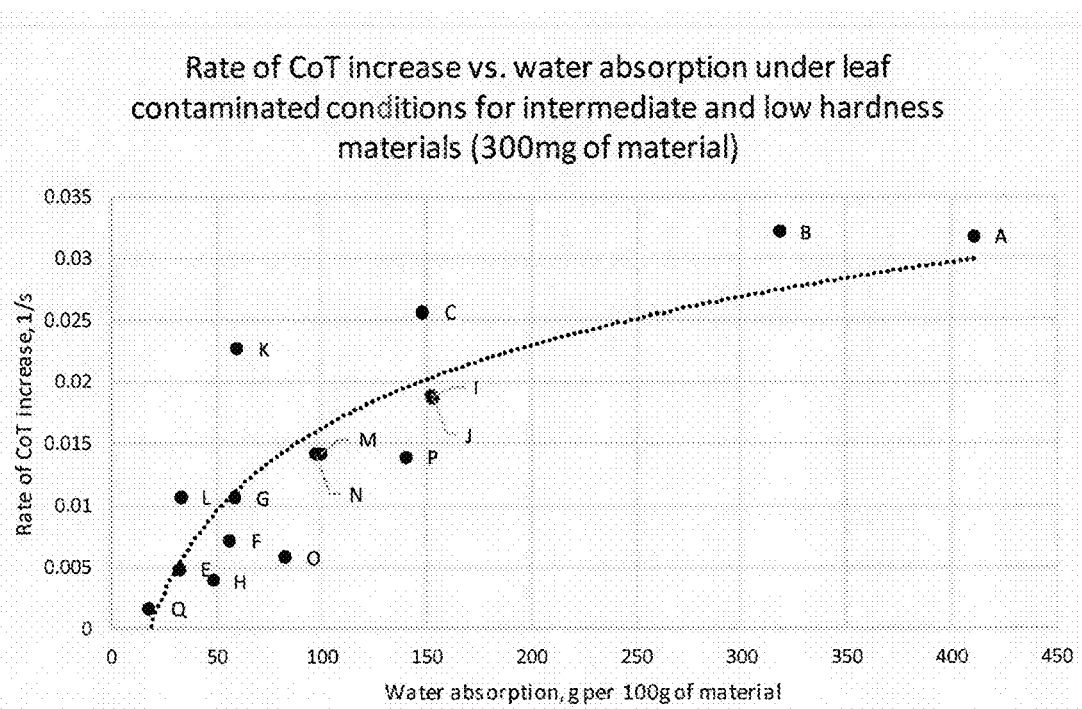
FIG. 6(c) shows a graphical representation of a relationship between: (i) a rate of coefficient of traction (CoT) increase between two surfaces that are in sliding or rolling-sliding contact with each other under leaf-contaminated conditions, upon application of different adhesion enhancement compositions (at an amount of 300 mg) comprising materials of different Mohs hardness values to the contacting surfaces; and (ii) the liquid absorptive abilities of the different adhesion enhancement compositions. A: HI-SIL™ T800 silica; B: LO-VEL27 silica; C: Silica gel; E: $Fe_2O_3$; F: $Fe_3O_4$; G: MgO; H: ZnO; I: Disperal HP 14/7; J: Attagel 50; K: Kamin 70C kaolin; L: Kamin 90 kaolin; M: Mica C4000; N: Nicron 604 talc; O: Volclay Bentonite; P: Attagel 19; Q: Calcium Carbonate.
Figure 7D:
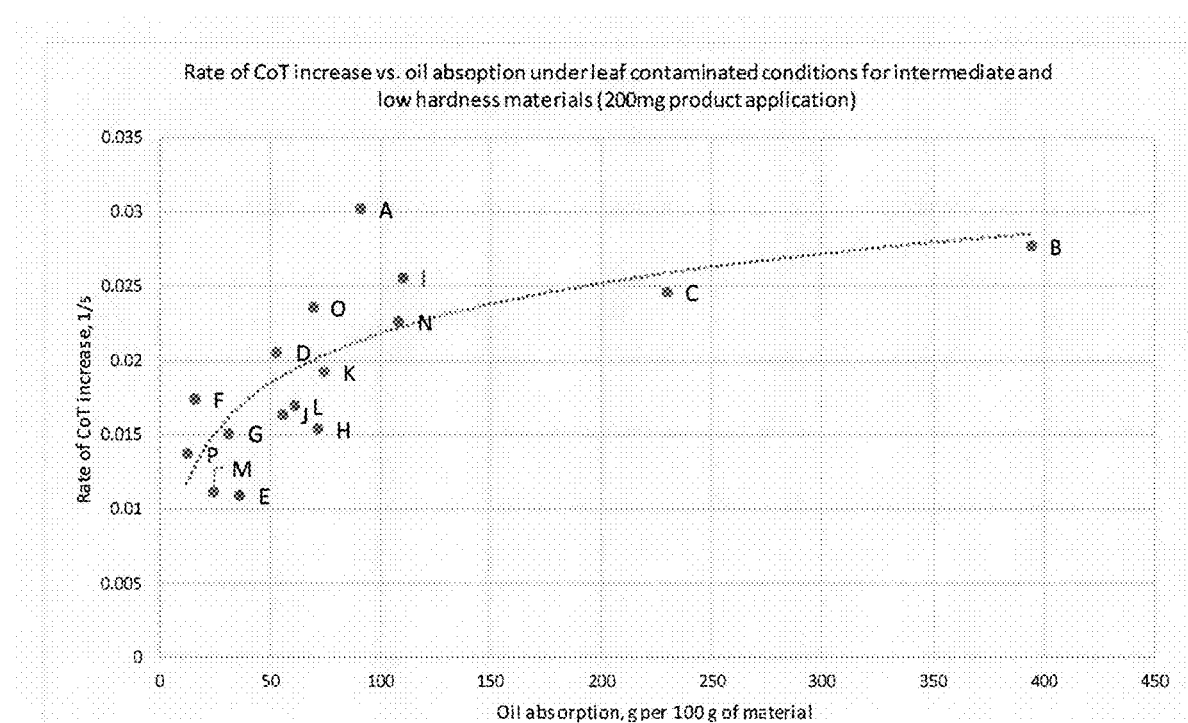
FIG. 7(d) shows a graphical representation of a relationship between: (i) a rate of coefficient of traction (CoT) increase between two surfaces that are in sliding or rolling-sliding contact with each other and contaminated with oil-based contaminants, upon application of different adhesion enhancement compositions comprising materials of different Mohs hardness values to the contacting surfaces at an amount of 200 mg; and (ii) the liquid absorptive abilities of the different adhesion enhancement compositions. A: silica gel; B: HI-SIL™ T800 silica; C: LO-VEL27 silica; D: MgO; E: ZnO Fisher; F: $Fe_2O_3$; G: $Fe_3O_4$; H: Kamin 70C kaolin; I: Dispersal HP 14/7; J: Kamin 90 kaolin; K: mica C4000; L: Nicron™ 604 talc; M: Volclay bentonite; N: Attagel 50; O: Attagel 19; P: $CaCO_3$.

As shown with reference to FIGS. 6(c) and 7(d) the rate of the coefficient of traction increases under leaf (FIG. 6(c)), or oil (FIGS. 7(b) and 7(d)), contaminated conditions, with an increase in the absorption capacity of the adhesion enhancement agent. Therefore, an absorbent material possessing a greater ability to absorb liquid, for example, but not limited to oil, water, contaminated water, oil-water mixtures, generally exhibits an increased traction coefficient between surfaces that are in sliding or rolling-sliding contact. In addition, the adhesion enhancement materials that exhibit an ability to absorb liquid, for example materials capable of absorbing from about 20 g of liquid per 100 g of material, to 500 g of liquid per 100 g of material, or any amount therebetween (see FIGS. 6(c), and 7(d)), provide greater rates in an increase of the traction coefficient at higher application rates (e.g. 200 mg, FIG. 7(d)). For example, the adhesion enhancement materials includes a material that exhibits the ability to absorb a liquid from about 20, 22, 24, 26, 28, 30, 32, 34, 36, 38, 40, 42, 44, 46, 48, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 520, 540, 560, 580, 600, 620, 640, 660, 680, 700, 720, 740, 760, 780, 800, 820, 840, 860, 880, 900, 920, 940, 960, 980, 1000 g water per 100 g of the material, or any amount therebetween.

Figure 9A:
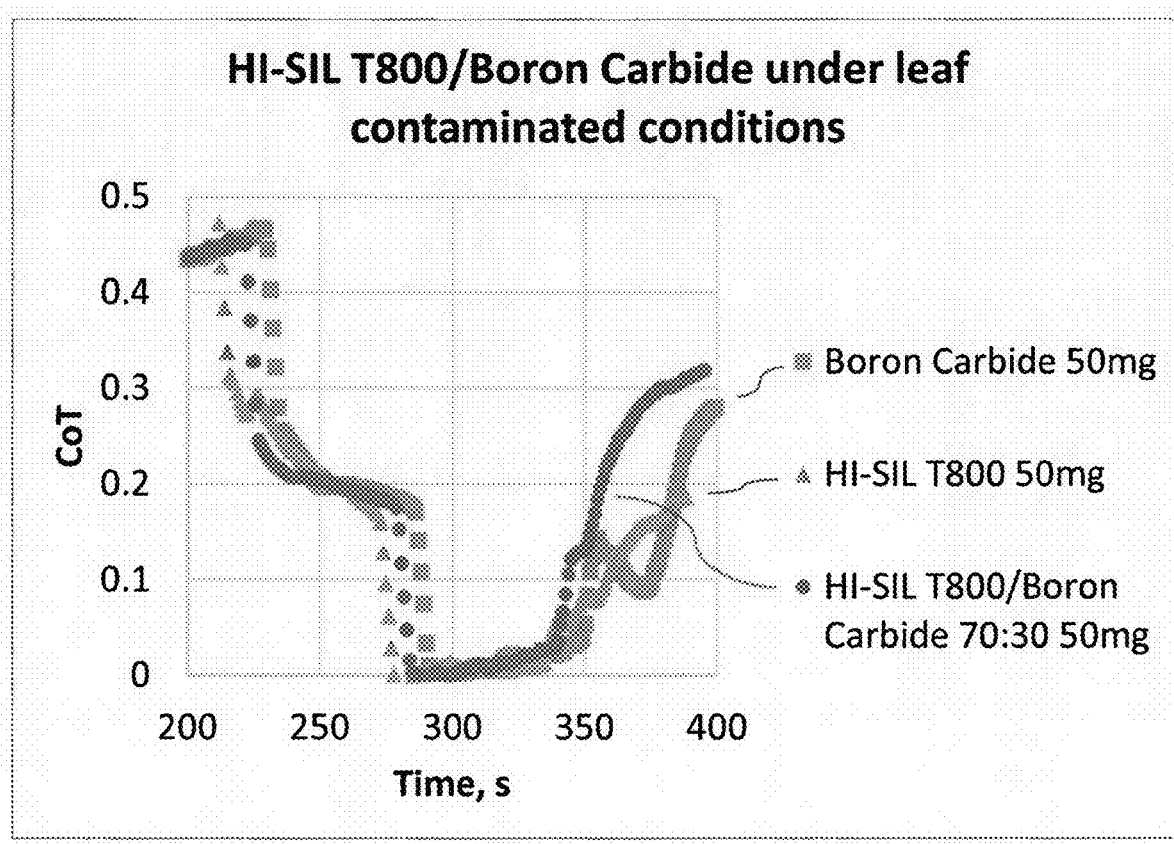
FIG. 9(a) shows a graphical representation comparing the change in the coefficient of traction (CoT) experienced between two surfaces that are in traction, sliding or rolling-sliding contact with leaf debris as the contaminant. A composition comprising HI-SIL™ T800 silica as the adhesion enhancement material (absorptive agent or second component; 50 mg), boron carbide as the abrasive agent or first component (50 mg) or a composition comprising HI-SIL™ T800 silica and boron carbide (in a ratio of 70:30; 50 mg) as the adhesion enhancement materials was applied at 330 seconds. Water was applied at 210 seconds; leaf debris was added at 270 seconds.
Figure 9B:
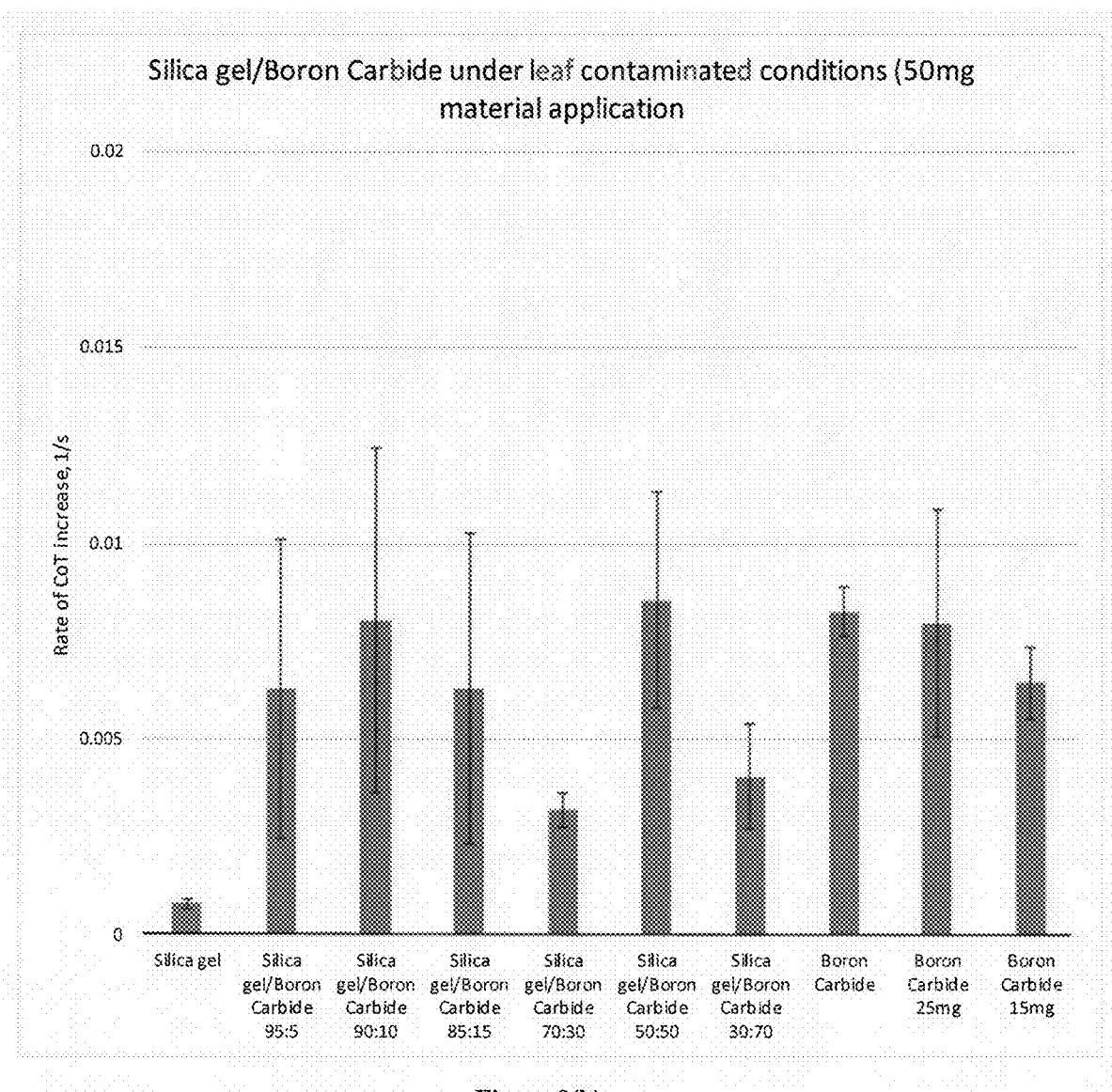
FIG. 9(b) shows the rate of coefficient of traction (CoT) increase between two surfaces that are in traction, sliding or rolling-sliding contact with leaf debris as the contaminant, using various adhesion enhancement agents. 50 mg of silica gel, boron carbide at 50 mg, 25 mg or 15 mg, or 50 mg of compositions comprising silica gel and boron carbide in ratios of 95:5, 90:10, 85:15, 70:30, 50:50, 30:70 (wt/wt), were applied using the time course as shown in FIG. 9(a). The increase in the coefficient of traction was determined over a 10 second interval following application of the adhesion enhancing agent.
Figure 9C:
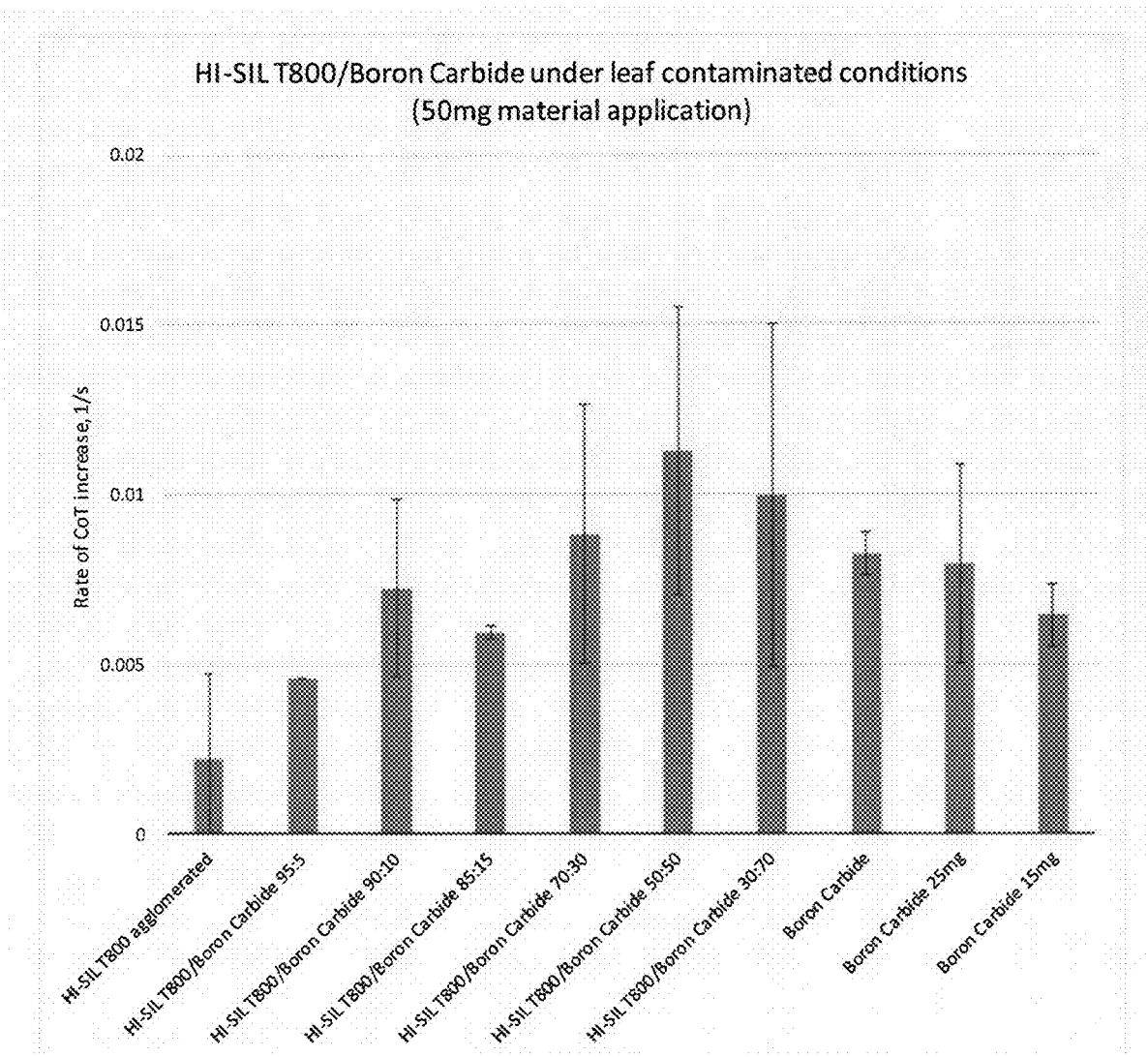
FIG. 9(c) shows the rate of coefficient of traction (CoT) increase between two surfaces that are in traction, sliding or rolling-sliding contact with leaf debris as the contaminant, using various adhesion enhancement agents. 50 mg of HI-SIL™ T800 agglomerated, boron carbide at 50 mg, 25 mg or 15 mg, or 50 mg of compositions comprising HI-SIL T800 agglomerated and boron carbide in ratios of 95:5, 90:10, 85:15, 70:30, 50:50, 30:70 (wt/wt), were applied using the time course as shown in FIG. 9(a). The increase in the coefficient of traction was determined over a 10 second interval following application of the adhesion enhancing agent.
Figure 9D:
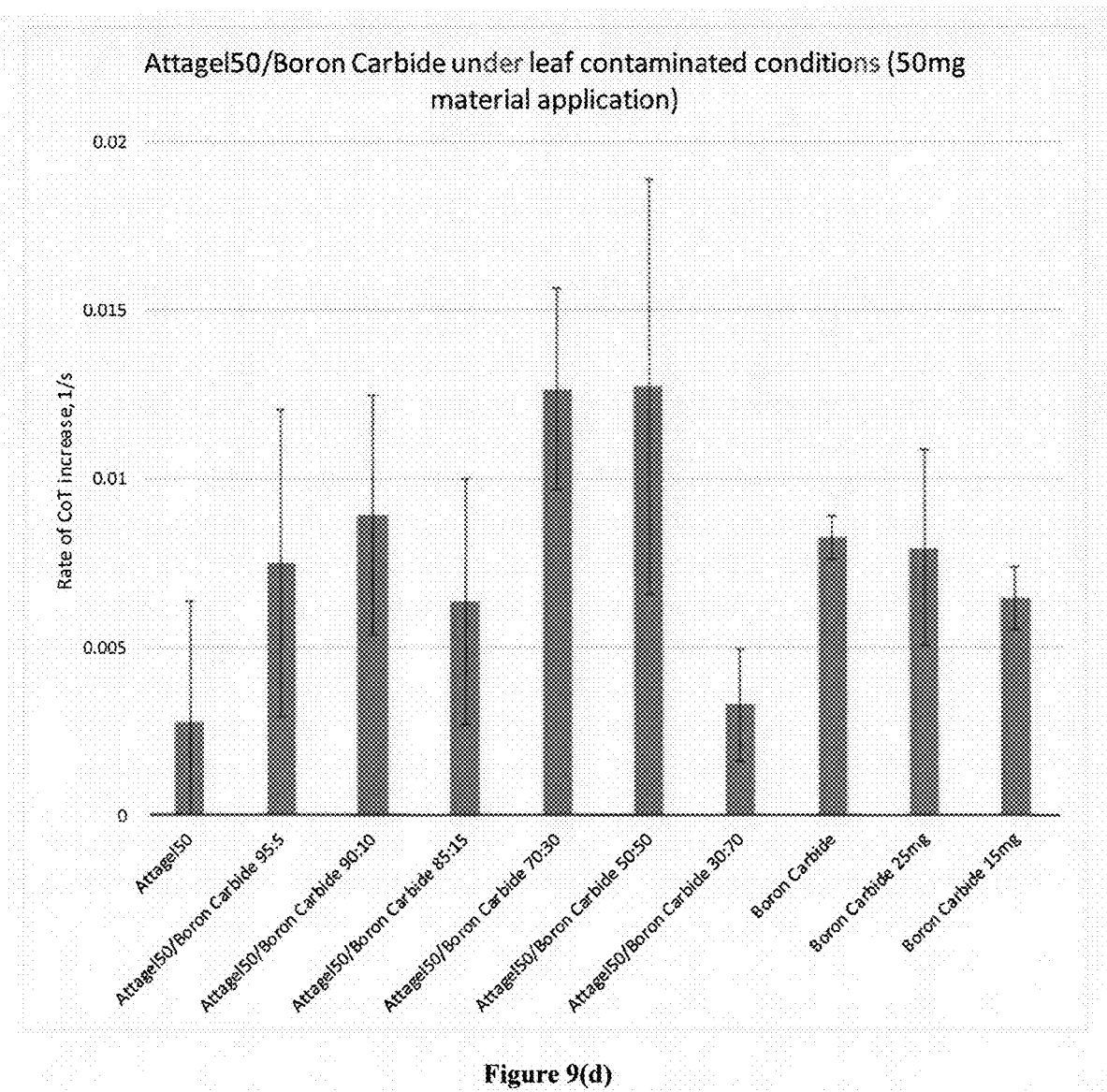
FIG. 9(d) shows the rate of coefficient of traction (CoT) increase between two surfaces that are in traction, sliding or rolling-sliding contact with leaf debris as the contaminant, using various adhesion enhancement agents. 50 mg of Attagel 50, boron carbide at 50 mg, 25 mg or 15 mg, or 50 mg of compositions comprising Attagel 50 and boron carbide in ratios of 95:5, 90:10, 85:15, 70:30, 50:50, 30:70 (wt/wt), were applied using the time course as shown in FIG. 9(a). The increase in the coefficient of traction was determined over a 10 second interval following application of the adhesion enhancing agent.
Figure 10:
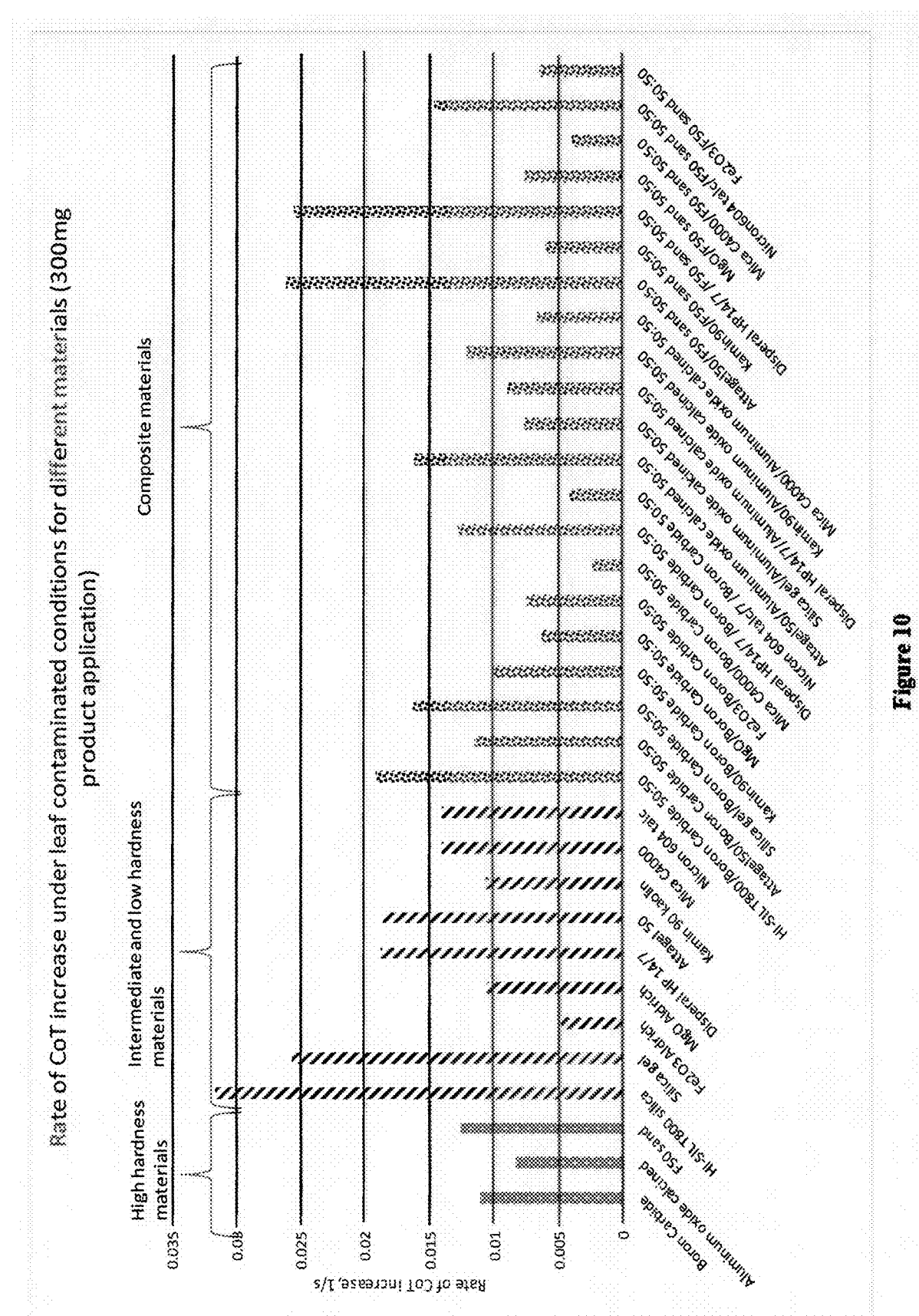
FIG. 10 shows the rate of coefficient of traction (CoT) increase between two surfaces that are in traction, sliding or rolling-sliding contact with leaf debris as the contaminant, using various adhesion enhancement agents and compositions applied using the time course as shown in FIG. 9(a). The increase in the coefficient of traction was determined over a 10 second interval following application of the adhesion enhancing agent. Composite materials were applied 50:50 (wt/wt); 300 mg application for all treatments. See Tables 1 and 2 for Mohs hardness and equivalent Vickers hardness values; High hardness: Mohs hardness great than or equal to 7; Intermediate hardness: Mohs harness of 4-7; Low hardness: Mohs hardness of less than or equal to 4.

A non-limiting example of a composition according to the present disclosure may comprises boron carbide as a material having a Mohs hardness value of greater than or equal to 7 (a first component or abrasive agent); and HI-SIL™ T800 silica as an absorbent material (the second component or absorptive agent); wherein the boron carbide and the HI-SIL™ T800 silica are provided in a 95:5, 90:10, 85:15, 70:30, 50:50, 30:70 ratio or any amount therebetween (See FIGS. 9(a), 9(c), and 10). Alternatively, the second component may be silica gel, wherein the boron carbide and the silica gel are provided in a 95:5, 90:10, 85:15, 70:30, 50:50, 30:70 ratio or any amount therebetween (See FIGS. 9(b) and 10), or the second component may be Attagel® 50 wherein the boron carbide and the Attagel® are provided in a 95:5, 90:10, 85:15, 70:30, 50:50, 30:70 ratio or any amount therebetween (See FIG. 9(d)). As shown in FIG. 10, the first component may also include, but is not limited to, aluminium oxide calcined, or F50 sand, and the second competent may further include, but is not limited to, HI-SIL™ T800, Attagel® 50, silica gel, Kamin 90, MgO, $Fe_2O_3$, Mica C4000, Dispersal® HP14/7, Nicron 604 talc.

FIG. 9(a) shows the change in the coefficient of traction in the presence of water and leaf debris, as measured using a twin-disk machine, over time. A continuous water supply was introduced to the equilibrated apparatus at approx. 210 sec, and this resulted in an initial decrease in traction coefficient. Leaf debris (along with water) was added at approx. 270 secs which resulted in a further decrease in the coefficient of traction between two surfaces. The adhesion enhancing agent comprising either HI-SIL™ T800 silica alone (50 mg), boron carbide alone (50 mg), or comprising a mixture of HI-SIL™ T800 silica and boron carbide (provided in a 70:30 ratio; 50 mg) was added to the apparatus at approx. 330 secs, and an increase in the coefficient of traction was observed with all treatments. However, the rate of the increase in the coefficient of traction was continuous and significantly greater using the HI-SIL™ T800 silica and boron carbide mixture compared with HI-SIL™ T800 silica, or boron carbide, alone. Boron carbide alone exhibited an initial increase in the coefficient of traction, followed by a transient decrease and a second increase, in the coefficient of traction. The decrease in the coefficient of traction observed using boron carbide alone was not observed using the combination of boron carbide and HI-SIL™ T800.

To improve the performance of absorbent materials under low application rate conditions, for example 50 mg of adhesion enhancement agent, composite products comprising a first component, for example, boron carbide and a second component, for example HI-SIL™ T800 silica (FIG. 9(c)) or silica gel (FIG. 9(b)) were tested (see FIG. 9(a)). Under low application rates (50 mg), these composite products exhibited a greater rate of coefficient of traction increase (adhesion enhancement) when compared with a second component alone (i.e. an absorbent material having a Mohs hardness between about 1 to about 7). The data shown in FIGS. 9(b) and 9(c) demonstrate that the addition of 5-15% (wt/wt) of a first component, for example, boron carbide, to a second component (the absorptive agent) is sufficient to significantly improve the performance of an adhesion enhancing composition. For this example, the compositions were prepared by mixing the dry powders into a uniform paste with small amounts of water followed by drying in oven at 500 deg C.

Furthermore, as shown in FIG. 9(c), the composition comprising HI-SIL™ T800 silica and boron carbide provided over a range of ratios outperforms the composition comprising HI-SIL™ T800 silica as the material providing adhesion enhancement over a range of application ratios of HI-SIL™ T800: boron carbide, from about 95:5 to 30:70. Similar results were also using test application rates of 50 mg, 100 mg, 150 mg and 200 mg. An improvement in the rate of coefficient of traction increase was also observed using compositions comprising silica gel (second component; absorptive agent) and boron carbide (first component; abrasive agent) when compared to silica gel alone, over a range of application ratios of silica gel:boron carbide, from about 95:5 to 30:70 as shown in FIG. 9(b). A similar result, in the rate of coefficient of traction increase was also observed using compositions comprising Attagel® (second component; absorptive agent) and boron carbide (first component; abrasive agent) when compared to Attagel® alone, over a range of application ratios of Attagel®:boron carbide, from about 95:5 to 50:50 as shown in FIG. 9(d).

With reference to FIG. 10, additional examples of adhesion enhancement compositions are shown demonstrating that the first component may also include, for example, but not limited to, aluminium oxide calcined, or F50 sand, and the second competent may further include, for example, but not limited to, HI-SIL™ T800, Attagel® 50, silica gel, Kamin 90, MgO, $Fe_2O_3$, Mica C4000, Dispersal® HP14/7, Nicron 604 talc.

Therefore, combinations of adhesion enhancement materials also demonstrate a synergistic increase in the rate of coefficient of traction increase. Without being bound by theory, it is believed that a composition comprising one or more first components with a Mohs hardness value of equal to or greater than 7 (Vickers hardness equal to or greater than 1000) and one or more second components with a Mohs hardness value of between about 1 to about 7 (Vickers hardness between about 10 to about 1000) and that are characterized with an ability to absorb liquid, can perform as an adhesion enhancement composition for a range of contaminant types, and over a wide range of application amounts or application rates.

The materials disclosed herein may have a particle size range from about 1 μm to about 2000 μm, or any amount therebetween. For example, the particle size range of the materials disclosed herein can be from about 1 μm to about 1000 μm, about 1 μm to about 500 μm, about 1 μm to about 300 µm, about 1 µm to about 200 µm, about 1 µm to about 100 µm, about 1 µm to about 90 µm, about 1 µm to about 80 µm, about 1 µm to about 70 µm, about 1 µm to about 60 µm, about 1 µm to about 50 µm, about 1 µm to about 40 µm, about 1 µm to about 30 µm, about 2 µm to about 30 µm. For example the particle size may be from about 1, 2, 4, 6, 8, 10, 12, 14, 16, 18, 20, 22, 24, 26, 28, 30, 32, 34, 36, 38, 40, 42, 44, 46, 48, 50, 55, 60, 65, 70, 75, 80, 85, 90, 95, 100, 120, 140, 160, 180, 200, 220, 240, 260, 280, 300, 320, 340, 360, 380, 400, 420, 440, 460, 480, 500, 525, 550, 575, 600, 625, 650, 675, 700, 725, 750, 775, 800, 825, 850, 875, 900, 925, 950, 975, 1000 µm, or any amount therebetween. Without wishing to be bound by theory, the particle size of the material may in-part, be related to the rate of coefficient of traction increase as determined with the twin-disk analysis, with a material having a lower particle size exhibiting a greater increase in the traction coefficient between two contacting surfaces. Example of materials having small particle size (i.e. from about 0.1-200 µm) that exhibit rate of coefficient of traction increase include (when compared to the rate of coefficient of traction increase obtained using F50 sand, see FIGS. 6(a), 6(b), 7(b)), include but are not limited to: HI-SIL™ T800, particle size 2.5 µm; boron carbide particle size 29.5 µm; Attagel® 50, particle size 9 µm; Nicron® 604 talc, particle size 2.4 µm; mica C400 17 µm; iron oxide, particle size 0.15 µm; magnesium oxide, particle size 100 µm; silica gel, particle size 132 µm. However, silica sand #140-270, #70-100 and #35-50 also exhibit a rate of coefficient of traction increase that is greater than F50 sand, yet these materials have an average, estimated particle size of 210 µm, 297 µm, and 707 µm, respectively.

The compositions described herein may be applied at any suitable rate of application in order to achieve the desired amount of adhesion between two steel surfaces. For example, which is not to be considered limiting, the composition may be applied at a rate of application from about 0.1 g/min to about 500 g/min, or any amount therebetween, or from about 0.5 g/m² to about 500 g/m², or any amount therebetween.

Manufacture of Adhesion Enhancement Composition

The adhesion enhancement compositions may be manufactured into any suitable form including, but not limited to, a liquid, a paste, an agglomerated powder, a powder, a powder coating, a solid stick, or as a film. In some cases, an agglomerated powder may improve application efficiency when compared to a powder.

The paste form of the adhesion enhancement composition may be prepared by mixing one or more than one first component, with the one or more than one second component in water or an organic solvent. Alternatively, the adhesion enhancement composition may comprise two or more than two first components, or two or more than two second components, and these components are mixed in water or an organic solvent. The compositions may be prepared by mixing the dry powders into a uniform paste with a small amount of water or non-aqueous solvent. If a powdered form of the adhesion enhancement composition is desired, the paste may be dried in an oven from 100 to 500 deg C. until the water or solvent is evaporated.

If an organic solvent is used, then any suitable organic or non-aqueous solvent, for example but not limited to ethanol, methanol, acetone, methylene chloride, ethyl acetate, propanol, cyclohexane, diethyl ether, dimethyl formamide, chloroform, carbon tetrachloride, chlorobenzene, tetrahydrofuran, toluene, or trimethyl amine. The organic or non-aqueous solvent is then evaporated from the mixture at room temperature. As some of the organic or non-aqueous solvent may be absorbed by one or more than one material during mixing, a paste is generally formed after the organic/non-aqueous solvent has been evaporated.

Adhesion enhancement compositions may be manufactured into a film form, using for example film forming agents as described in WO 02/26919 (which is incorporated herein by reference in its entirety).

The adhesion enhancement compositions as descried herein that are in a film-form may further comprise one or more retentivity agents. By "retentivity agent" it is meant a chemical, compound or combination thereof which increases the effective lifetime of operation or the durability of an adhesion enhancement composition between two or more surfaces is sliding-rolling contact. Generally, a retentivity agent provides, or increases, film strength and/or adherence to a substrate. Examples of suitable retentivity agents that may be used in a film form of an adhesion enhancement composition, include but are not limited to: poly vinyls, polyvinyl alcohol, polyvinyl chloride or a combination thereof, for example, but not limited to, Airflex™ 728 (Air Products and Chemicals), Evanol™ (Dupont), Rovace™ 9100, or Rovace™ 0165 (Rohm & Haas); oxazolines, for example, but not limited to, Aquazol™ 50 & 500 (Polymer Chemistry); styrene butadiene compounds, for example for example but not limited to, Dow Latex 226 & 240 (Dow Chemical Co.); styrene acrylate, for example but not limited to, Acronal™ S 760 (BASF), Rhoplex™ E-323LO Rhoplex™ HG-74P (Rohm & Hass), Emulsion™ E-1630, E-3233 (Rohm & Hass); epoxies comprising a two part system of a resin and a curing agent; acrylic epoxy hybrid; urethane acrylic; polyurethane dispersions; various gums and resins; or any combination thereof.

Adhesion enhancement compositions may be manufactured into a solid stick form by methods that are known in the art (WO 2006/084386, incorporated by reference in its entirety). Such solid stick-form adhesion enhancement compositions may, for example, comprise: from about 20 to about 80 weight percent of a thermosetting resin; from about 20 to about 80 weight percent of the adhesion enhancement material, for example one or more than one first component, one or more of the second component, or a combination thereof, and optionally, from about 0 to about 30 weight percent of a thermosetting plasticizer.

Examples of suitable thermosetting resins include, but are not limited to, epoxy novolac-based vinyl ester, brominated bisphenol-epoxy vinyl ester, vinyl polyester, bisphenol-epoxy vinyl ester, halogenated isophthalic polyester, isophthalic polyester, halogenated polyester, polystyrene, soybean-derived unsaturated polyester resin, corn resin, acrylated epoxidized soybean oil, epoxidized vegetable oil, maleinated soybean monoglyceride, maleinated hydroxylated soybean oil, natural fish oil, soybean oil, tung oil, and a blend or a combination thereof.

If a thermosetting resin is used, then examples of suitable thermosetting plasticizers include, but are not limited to, dioctyl phthalate, adipate, a polymeric plasticizer, a branched phthalate, linear phthalate, branched adipate, mixed dibasic acid polyester, trimellitate, polyester glutarate, polyester adipate, citrate, polymeric plasticizer, sebacates, adipic acid polyesters, dioctyl adipate, a soybean-based plasticizer, and mixtures thereof.

It is contemplated that any part of any aspect or embodiment discussed in this specification can be implemented or combined with any part of any other aspect or embodiment discussed in this specification. While particular embodiments have been described in the foregoing, it is to be understood that other embodiments are possible and are intended to be included herein. It will be clear to any person skilled in the art that modification of and adjustment to the foregoing embodiments, not shown, is possible.

What is claimed is:

1. A composition for increasing adhesion between two surfaces that are in traction, sliding or rolling-sliding contact with each other, the composition consisting of:
   (a) one or more than one first component, each of the one or more than one first component having a Mohs hardness value of equal to or greater than 7, or a Vickers hardness of greater than or equal to 1000, wherein the one or more than one first component is selected from the group of carbide based compounds, amphoteric oxide based compounds, zirconium oxide based compounds, a mineral compound, boron carbide, boron nitride, diamond, nanocrystalline diamond, fullerite, polymerized C60, garnet, topaz, crystalline silica (sand), and any combination thereof; and
   (b) an organic rheology additive, wherein the organic rheology additive is a xanthan gum,
      wherein the one or more than one first component is present in an amount from 90% to 99.9% (wt/wt) and the organic rheology additive is present in an amount from 10% to 0.1% (wt/wt), and
      wherein the composition is a powder form.

2. The composition according to claim 1, wherein the one or more than one first component is present in an amount of 90%, 91%, 92%, 93%, 94%, 95%, 96%, 97%, 98% 99% or 99.9% (wt/wt) and the organic rheology additive is present in an amount of 10%, 9%, 8%, 7%, 6%, 5%, 4%, 3%, 2%, 1% or 0.1% (wt/wt).

3. The composition according to claim 2, wherein the one or more than one first component is present in an amount of about 95% and the organic rheology additive is present in an amount of about 5%.

4. The composition according to claim 1, wherein the one or more than one first component has a particle size of from about 1 μm to about 1600 μm.

5. The composition according to claim 4, wherein the particle size is from about 1 μm to about 30 μm.

6. The composition according to claim 1, wherein the organic rheology additive has a particle size of less than 500 μm.

7. The composition according to claim 1, wherein the powder form is an agglomerated powder.

8. The composition according to claim 1, wherein the xanthan gum is a mixture of greater than 99% by weight xanthan gum and less than 1% by weight glyoxal.

* * * * *